United States Patent [19]

Sugino et al.

[11] Patent Number: 5,829,039
[45] Date of Patent: Oct. 27, 1998

[54] MEMORY CONTROL METHOD/DEVICE FOR MAINTAINING CACHE CONSISTENCY WITH STATUS BIT INDICATING THAT A COMMAND IS BEING PROCESSED WITH RESPECT TO A MEMORY AREA

[75] Inventors: Masatoshi Sugino; Naozumi Aoki; Yukihiko Kitano; Kenro Nagato, all of Kawasaki, Japan

[73] Assignee: Fujitsu Limited, Kawasaki, Japan

[21] Appl. No.: 869,740

[22] Filed: Jun. 5, 1997

Related U.S. Application Data

[63] Continuation of Ser. No. 405,984, Mar. 17, 1995, abandoned.

[30] Foreign Application Priority Data

Jun. 1, 1994 [JP] Japan .................................... 6-119904

[51] Int. Cl.⁶ .................................................. G06F 12/08
[52] U.S. Cl. ........................... 711/144; 711/145; 711/121
[58] Field of Search .................................. 711/118, 121, 711/141, 143, 144, 145

[56] References Cited

U.S. PATENT DOCUMENTS

| | | | |
|---|---|---|---|
| 4,949,239 | 8/1990 | Gillett, Jr. et al. ...................... | 395/288 |
| 5,297,269 | 3/1994 | Donaldson et al. . | |
| 5,377,345 | 12/1994 | Chang et al. ........................... | 395/445 |
| 5,398,325 | 3/1995 | Chang et al. ........................... | 395/403 |
| 5,428,761 | 6/1995 | Herlihy et al. .......................... | 395/457 |
| 5,434,993 | 7/1995 | Liencres et al. ........................ | 395/460 |

FOREIGN PATENT DOCUMENTS

| | | |
|---|---|---|
| 095 598 | 12/1983 | European Pat. Off. . |
| 0 194 024 A3 | 9/1986 | European Pat. Off. . |
| 0 380 861 A2 | 8/1990 | European Pat. Off. . |
| 0 507 063 A1 | 10/1992 | European Pat. Off. . |

OTHER PUBLICATIONS

IBM Technical Disclosure Bulletin; vol. 26; No. 8; Jan. 1994 Bin in Transit Mechanism; M. A. Krygowski and W. D. Silkman.

*Primary Examiner*—Tod R. Swann
*Assistant Examiner*—Christopher S. Chow
*Attorney, Agent, or Firm*—Armstrong, Westerman, Hattori, McLeland & Naughton

[57] ABSTRACT

A memory control method and a memory control device each suitable for information processing systems such as multiprocessing systems where plural data processing systems concurrently execute an operating process, and more particularly a memory control method and a memory control device each of which controls the data holding state of a buffer memory unit arranged in each of data processing units on a store-in basis to gain high speed access to the main storage unit. The memory control device issues a predetermined process command to be sent to the buffer memory unit in the data processing unit, and sets a flag showing a process under request, to a portion to be processed by the predetermined process command in a tag copying unit in the memory control device. Information regarding whether a block including a process request address exists in the buffer memory unit and whether the block is being processed currently are simultaneously obtained by retrieving only the tag copying unit. Thus, the address comparing unit can be omitted because no address comparison is needed. This structure reduces the amount of hardware and improves the port use efficiency, thus realizing the reduced system construction cost and improved processing speed.

26 Claims, 17 Drawing Sheets

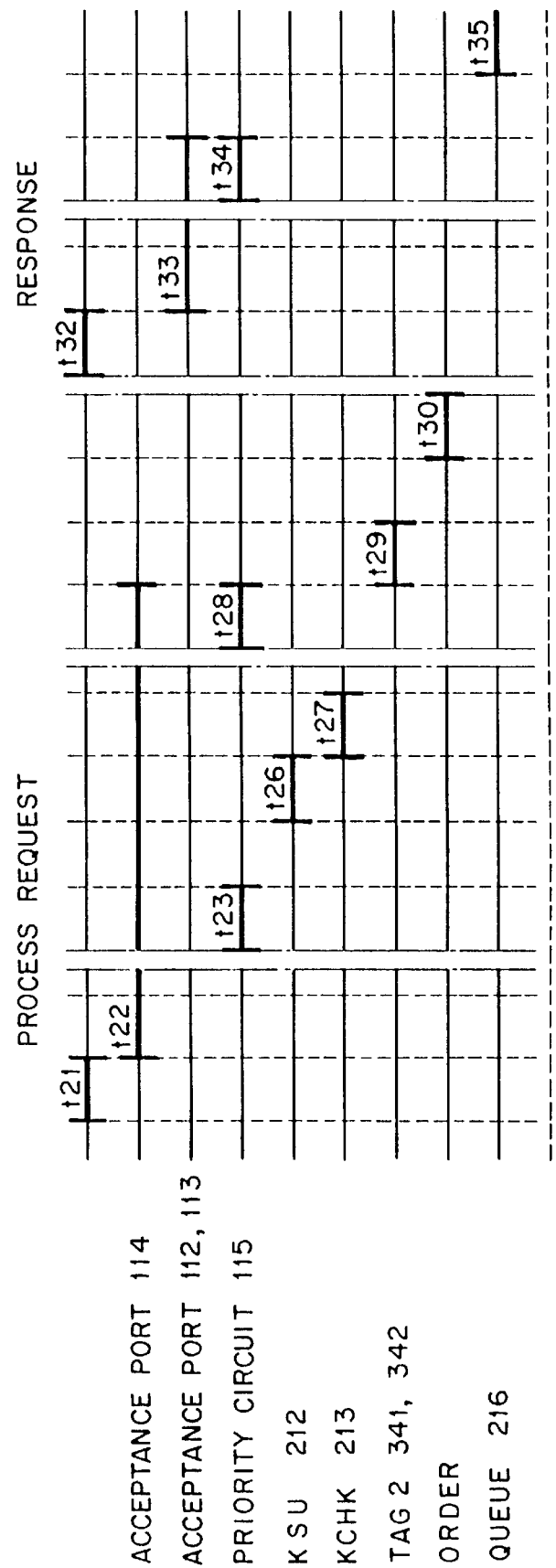

MEMORY CONTROL METHOD/DEVICE FOR MAINTAINING CACHE CONSISTENCY WITH STATUS BIT INDICATING THAT A COMMAND IS BEING PROCESSED WITH RESPECT TO A MEMORY AREA

This application is a continuation of application Ser. No. 08/405,984, filed Mar. 17, 1995, now abandoned.

BACKGROUND OF THE INVENTION

1) Field of the Invention

The present invention relates to a memory control method and a memory control device each suitably used for information processing systems such as multiprocessing systems where plural data processing units execute concurrently an operating process. Particularly, the present invention relates to a memory control method and a memory control device each of which controls the state of data held in a buffer memory unit on a store-in basis, the buffer memory unit arranged in each of data processing units, to gain high speed access to a main storage unit.

2) Description of the Related Art

Recently, research and development has been made to improve the processing capability of information processing equipment. Particularly, in order to realize improved processing speed, it has been desired to obtain a high speed access of the memory device. One of approaches is to construct the hierarchical memory system.

The information processing equipment consists of plural data processing units (central processing units (CPUs)) each of which executes a data operation process, a main storage unit that stores data, and a memory control unit that temporarely stores data information that the data processing unit has accessed the main storage unit, into a buffer memory unit, and then controls it. Particularly, remarkable progress has been made in the multiprocessing system where plural CPUs operate concurrently and in parallel to execute operation using data processing equipment.

The conversion into a multiprocessor tends to increase the number of reading or writing requests which are issued simultaneously from plural CPUs to the memory control unit. High speed processing leads to gaining high speed access to a request. Hence, it has been desired to deal concurrently with requests to addresses which do not contend with each other.

In the case where the buffer memory unit is controlled on a store-in basis, since the latest data of an address to be processed is stored in the top-level buffer memory unit, a data transfer or an invalidating process is needed between plural buffer memory units. It must be limited to gain an interrupt access to a block including an address to be processed during processing. Hence a shortened access waiting time to a request and improvement in an access throughput are required.

FIG. 12 is a block diagram showing an information processing device that processes concurrently in response to requests to addresses which do not contend with each other to gain high speed access. Referring to FIG. 12, the main storage unit 101 stores data sets.

Numeral 102 is a data processing unit (or CPU) which can execute concurrently and in parallel an operation process and numeral 103 is a data processing unit (or CPU) which can execute concurrently and in parallel an operation process. The data processing unit 102 includes a buffer memory unit (BS) 106 and the data processing unit 103 includes a buffer memory unit (BS) 107.

The buffer memory unit 106 includes a data region 108 that holds a piece of data stored in the main storage unit 101 and a tag region 109 that holds tag information including the address of data stored in the data region 108. The buffer memory unit 107 includes a data region 110 that holds a piece of data stored in the main storage unit 101 and a tag region 111 that holds tag information including the address of data stored in the data region 109.

The input/output control unit (IOP) 104 outputs a request to be sent to the data processing units 102 and 103 to the memory control unit 105.

The memory control unit (MCU) 105 controls data transfer between the main storage unit 101 and the buffer memory units 106 and 107 on a store-in basis. The memory control unit 105 includes acceptance ports 112 to 114, a priority circuit 115, a tag copying unit (a second tag unit, TAG 2) 116, an address comparing unit 117, an order issuing unit 118, a response waiting control port 119, and an order response processing unit 120.

The acceptance port 112 stores a process request from the data processing unit 102; the acceptance port 113 stores a process request from the acceptance port 103; and the acceptance port 114 stores a process request from the input/output control unit 104. The priority circuit 115 outputs selectively either one of process requests from the acceptance ports 112 to 114.

The tag copying unit 116 stores the copies of the tag regions 109 and 111 in the buffer memory unit and then retrieves an address corresponding to a process request selected with the priority circuit 115 which is stored in the buffer memory unit 106 or 107.

The address comparing unit 117 compares the address corresponding to a process request selected with the priority circuit 115 with the addresses corresponding to all process requests in a waiting state stored in the acceptance ports 112 to 114.

The order issuing unit 118 captures the retrieval result (refer to numeral 126 in FIG. 12) from the tag copying unit 116 and the comparison result (refer to numeral 127 in FIG. 12) from the address comparing unit 117, and then issues an order (MCU order) corresponding to a request if either the buffer memory units 102 or 103 stores an address to be processed, or an address corresponding to a process request input from the priority circuit 115 while a block including a target address is not in a response waiting state of an order once issued.

The order is a general term of a data transfer request or a process request which invalidates entries existing in the buffer memory units 106 and 107, issued from the memory control unit 105 to the buffer memory units 106 and 107.

The response waiting control port (BCP) 119 sets bits as order-issuing sources respectively corresponding to the data processing units 102 and 103. The order response processing circuit 120 inputs a response to an order and then resets a bit corresponding to a request source set by the response control port 119.

The operation of the information processing device will be described below with reference to the flowchart shown in FIG. 13 and the timing chart shown in FIG. 14.

For a brief explanation, it is assumed that all responses to process requests have been returned during the duration t6 shown in FIG. 14.

For example, a process request (or request) issued from the data processing unit 102 (refer to the step A1 shown in FIG. 13 and the duration t1 shown in FIG. 14) is stored in the request acceptance port 112 within the memory control unit 105 (refer to the step A2 in FIG. 13 and the duration t2 shown in FIG. 14).

When the priority circuit 115 selects a process request stored in the acceptance port 112 (refer to YES route in the step A3 shown in FIG. 13 and the duration t3 shown in FIG. 14), the tag copying unit 116 retrieves the address corresponding to the process request (refer to the step A4 shown in FIG. 13 and the duration t4 shown in FIG. 14) to decide whether the address of interest is held in the buffer memory unit 109 or 111 (refer to the step A5 in FIG. 13). At the same time, the address comparing unit 117 compares the address with the process request addresses of all requests (refer to the step A6 in FIG. 13) and decides whether an address of interest is in a waiting state (refer to the step A7 in FIG. 13).

The order issuing unit 118 receives the retrieval result 126 from the tag copying unit 116 and the comparison result 127 from the address comparing unit 117, and then issues an order in response to the process request when an address of interest exists in either the buffer memory unit 106 or 107 and data block including the address of interest is not in a response waiting state to the order of a data block previously issued (refer to the steps A8 and A9 in FIG. 13 and the duration t5 in FIG. 14).

In the step A9, a bit (refer to numeral 121 in FIG. 12) which corresponds to the data processing unit of the order issuing source within the response waiting control port 45 is set at the same time when an order corresponding to a process request is issued (refer to the step A10 in FIG. 13).

Thereafter, after the data processing units 102 and 103 have responded to the issued order (refer to numerals 122 and 123 in FIG. 12 and the duration t6 in FIG. 14) (YES route in the step A11), the order responding circuit 120 resets the bit 121 in the order issuing unit 118 (refer to the numeral 124 in FIG. 12 and the step A12).

After all the bits in the bit 121 have been reset (YES route in the step A13), the response-wait control port 119 outputs a port reset signal (refer to numeral 125 in FIG. 12), thus releasing the acceptance port 112 (refer to the step A14 in FIG. 13).

When the order issuing unit 118 decides that an address of interest exists in the buffer memory unit 106 or 107 and in the waiting state of an order previously issued, based on the retrieval result 126 from the tag copying unit 116 and the comparison result 127 from the address comparing unit 117, it is decided that the order issuing unit 118 cannot issue an order. Thus, the process request selected by the priority circuit 115 is canceled (refer to the steps A8 to A15 in FIG. 13). Since the acceptance port 112 holds the process request, the priority circuit 115 can select it again (refer to the step A3 in FIG. 13).

When an address of interest exists in neither the buffer memory unit 106 or 107, based on the retrieval result 126 from the tag copying unit 116 and the comparison result 127 from the address comparing unit 117, the order issuing unit 118 requests the main storage unit 101 to read out the data block of the address of interest (refer to the step A16 in FIG. 13). The response waiting control port 119 outputs a port reset signal 125 to release the acceptance port 112 (refer to the step A14 in FIG. 13).

With the recent multiprocessor-oriented technologies, a memory protection checking that checks whether an access to a requested address is possible is generally performed to prevent plural programs and data from being destroyed due to an input and output operation.

In the case of a store request sent to the main storage unit accompanying the memory protection checking, the check-ing must be completed before a writing operation instruction is sent to the main storage unit.

In some store-in-type information processing equipment, the latest data does not exist in a main storage unit, but exists only in the buffer memory unit in the data processing unit. In this case, when a store request in a data unit smaller than the minimum move-out unit in the buffer memory unit is issued from the input/output control unit to the main storage unit, a data block with an address to be subjected to a store request must be moved from the data processing unit to the main storage unit before data is stored from the input/output control unit to the main storage unit.

Hence, when a store request to the main storage unit issued from the input/output control unit to the memory control unit, together with a memory protection checking, and issued to the data unit smaller than the minimum move-out unit of the buffer memory unit, the input/output control unit stores data is the main storage unit after both the result of the memory protection checking and the retrieval result of the tag copying unit (the second tag region) have been reported.

FIG. 15 is a block diagram showing an information processing device with a memory protection checking function. Referring to FIG. 15, the information processing device includes the main storage unit 101, the data processing units 102 and 103, and the input/output control unit 104, each of which functions in a manner similar to the corresponding element in the information processing device shown in FIG. 12. The memory control unit 205 includes the acceptance ports 112 to 114, the priority circuit 115, and the tag copying unit 116, each of which functions in a manner similar to the corresponding element in the memory control unit 105.

The memory control unit 205 includes a memory protection key storing unit (KSU) 212 which stores data (key) to perform a memory protection check according to a process request from the input/output unit 104.

The process request described above is a store request with a memory protection check to be issued to the main storage unit 101 from the input/output control unit 104 to the memory control unit 205. The store request is issued to the data unit smaller than the minimum move-out unit of the buffer memory units 106 or 107 and issued to an address with the latest data to the main storage unit 101.

The memory protection checking circuit (KCHK) 213 performs a memory protection checking, based on the data for the memory protection check read out of the memory protection key storing unit 212 according to the address corresponding to the process request from the priority circuit 115. When the checking result shows an accessible state, the priority circuit 115 resumes its selecting operation and at the same time outputs a releasing control signal to the acceptance port 114.

Moreover, numeral 216 represents a queue which stores a store request issued from the memory control unit 205 to the main storage unit 101, and 217 represents a priority circuit which selects the priority of the store request.

The operation of the information processing equipment having the above-configuration will be described below with reference to the flowchart shown in FIG. 16 and the timing chart shown in FIG. 17.

In other words, when a store request accompanying the memory protection check which is issued to data unit smaller than the minimum move-out unit of each of the buffer memory units 106 and 107 is issued to the main storage unit 101 via the input/output control unit 104 (refer to the step B1 shown in FIG. 16 and the duration t21 shown in FIG. 17), it is stored into the acceptance port 114 (refer to the step B2 shown in FIG. 16 and the duration t22 shown in FIG. 17).

When the priority circuit 115 selects the store request (refer to the step B3 in FIG. 16 and the duration t23 in FIG. 17), it reads out data used for a memory protection checking (refer to duration t26 in FIG. 17). Then the memory protection checking circuit 213 performs the memory protection checking (refer to the step B4 in FIG. 16 and the duration t27 in FIG. 17).

In other words, the memory protection key storing unit 212 reads out a key corresponding to the address to be subjected to the store request. The memory protection checking circuit 213 compares the key with the key-checking key associated with the store request. The result of the memory protection checking is informed to the acceptance port 114. If the access is not allowed (refer to the NO route of the step B4 in FIG. 16), the store request is canceled (in the step B14 in FIG. 16). As a result, the acceptance port 114 is released.

When the access is allowed, the fact is reported to the acceptance port 114 (the step B5 in FIG. 16). Then till the priority circuit 115 participates in a selecting operation, the acceptance port 114 queues and holds the store request from the input/output control unit 104. When the priority circuit 115 selects the store request held by the acceptance port 114 (refer to the step B6 in FIG. 16 and the duration t28 shown in FIG. 17), the acceptance port 114 is released (in the step B7 in FIG. 16). Then by retrieving the tag copying unit 116, it is decided whether the latest data of the corresponding address exists in the buffer memory unit 106 or 107 (in the step B8 in FIG. 16 and the duration t29 in FIG. 17).

If it is decided that the latest data exists in neither of the buffer memory units 106 or 107 (an erroneous hit, the NO route in the step B8 shown in FIG. 16), the store data from the input/output control unit 104 is stored into the main storage unit 101 (in the step B13 shown in FIG. 16).

If it is decided that the latest data exists in the buffer memory unit 106 or 107 (a data hit, the YES route of the step B8 shown in FIG. 16) the memory control unit 205 issues a move-out order to the data processing unit 102 or 103 having the latest data (refer to the duration t30 shown in FIG. 17).

When the acceptance port 112 or 113 stores a response (refer to the duration t33 in FIG. 17) to the order issued from the data processing unit 102 or 103 (refer to the step B10 in FIG. 16 and the duration t32 in FIG. 17), the priority circuit 115 takes part in a priority selection (in the step B11 shown in FIG. 16).

Thereafter, when the priority circuit 115 selects the response to the order (refer to the duration t34 in FIG. 17), the acceptance port 112 or 113 storing the response is released. The main storage unit 101 is accessed with an address corresponding to a store request via the queue 216 and the priority circuit 217. Then the main storage unit 101 stores the move-out data from the data processing unit 102 or 103 (refer to the step B12 in FIG. 16 and the duration t35 in FIG. 17) as well as the store data from the input/output control unit 104 (in the step B13 in FIG. 16).

However, according to the memory control method applied to the information processing equipment shown in FIGS. 12 to 14, an address comparison detects whether the address of a process request selected by the priority circuit 115 is in the contention condition, or in the waiting condition on a request previously issued.

Therefore in order to execute a high speed comparing operation to plural process requests in a response waiting state, the plural circuits (or the address comparing units 117) must be arranged to execute a parallel comparing operation. An increasing number of data processing units require many ports 112 to accept process requests. Hence there has been a disadvantage in that the prior-art information processing equipment leads to an increased amount of necessary hardware, an increased system constructing cost, and a complicated system construction.

Moreover, there is an advantage in that since the acceptance port 112 must hold an address for comparison till all responses return to process requests (till the time t6 in FIG. 14), it is occupied for a long period of time, whereby the use efficiency and the processing rate are decreased.

In the information processing system which performs the memory protection checking shown in FIGS. 15 to 17, where the input/output control unit 104 issues a store request, together with a memory protection checking, the memory protection checking process and the retrieving process in the tag copying unit 116 are independently performed along the different flows, as shown in FIG. 17. The memory protection checking is performed along the first flow in which the priority circuit 115 selects the store request from the acceptance port 114. As a result, when accessing is allowed, the tag copying unit 116 performs the retrieving process along the flow which starts when the priority circuit 115 selects the store request from the acceptance port 114.

Hence, the tag copying unit 116 cannot be retrieved till the result of the memory protection checking is known, whereby the memory protection key storing unit 212 takes much time to perform the key reading in the memory protection checking operation. Particularly, when the retrieval result from the tag copying unit 116 is a hit, the move-out is issued very slowly. This means that the use efficiency is very poor because the memory protection checking rarely inhibits an access operation.

The acceptance port 114 once stores and holds a store request from the input/output control unit 104 till at least the result of the memory protection checking is known. Moreover, if the memory protection checking shows an allowable access, the store request is maintained till the tag copying unit 116 starts the retrieval process flow. That is, there is a disadvantage in that the acceptance port 114 cannot be released till the memory protection checking at least is ended. Hence, the following request cannot be received for a long time, whereby the use efficiency and the high speed process are degraded.

SUMMARY OF THE INVENTION

The present invention is made to overcome the above mentioned problems. An object of the present invention is to provide a memory control method which can reduce the amount of hardware and improve the port use efficiency, thus realizing the system constructing cost reduced and the processing speed improved.

Another object of the invention is to provide a memory control device which can reduce the amount of hardware and improve the port use efficiency, thus realizing the system constructing cost reduced and the processing speed improved.

In order to achieve the above objects, according to the present invention, the memory control method suitable for an information processing device, the memory control method suitable for an information processing system including a memory unit, at least one of data processing units each of which operates based on data stored in the memory unit, a memory control unit that controls data transfer between the memory unit and the data processing unit, and a buffer memory unit, the buffer memory unit having a data region which holds a piece of data stored in the memory unit of each data processing unit and a tag region which holds tag information including the address of data stored in said data unit; the memory control unit including a tag copying unit that holds a piece or all of copy information stored in the tag region in the buffer memory unit, and a port which holds a process request sent from each data processing unit or an external process request; the memory control method including issuing a predetermined processing command sent to said buffer memory unit from the memory control unit to the data processing unit, according to a process request held by the port and with reference to the tag copying unit; and controlling the data holding state of the buffer memory unit on a store-in basis; the memory control method further including the steps of issuing the predetermined processing command sent to the buffer memory unit to the data processing unit; and setting at the same time a flag showing a process under request, to a portion to be processed under the predetermined processing command held in the tag copying unit.

According to the present invention, the memory control device suitable for an information processing system including a memory unit, at least one of data processing units each of which operates based on data stored in the memory unit, and a buffer memory unit, the buffer memory unit having a data region which holds a piece of data stored in the memory unit of each data processing unit and a tag region which holds tag information including the address of data stored in the data region; the memory control device includes a tag copying unit that holds a piece or all of copy information stored in the tag unit in the buffer memory unit; a port that holds a process request sent from the data processing unit or an external process request; and process command issuing means for issuing a predetermined processing command to be sent to the buffer memory unit from the memory control unit to the data processing unit, according to a process request held by the port and with reference to the tag copying unit; whereby the data transfer between the memory unit and the buffer memory unit is controlled on a store-in basis; the tag copying unit including a bit with which a flag showing a process under request, to the buffer memory unit is set; the process command issuing means including flag setting means which issues the predetermined processing command to be sent to the buffer memory unit to the data processing unit and sets at the same time a flag showing a process under request, to a portion to be processed under the predetermined processing command held in the tag copying unit.

Furthermore, according to the present invention, the memory control method suitable for an information processing system including a memory unit, at least one of data processing units each of which operates based on data stored in the memory unit, an input/output control unit that performs a store request to the memory unit, together with a memory protection checking, a memory control unit that controls data transfer between the memory unit and the data processing unit or the input/output control unit, and a buffer memory unit, the buffer memory unit having a data region which holds a piece of data stored in the memory unit of each data processing unit and a tag region which holds tag information including the address of data stored in said data region; the memory control unit including a tag copying unit that holds a piece or all of copy information stored in the tag region in the buffer memory unit, a port which holds a process request sent from the data processing unit or the input/output control unit, and memory protective deciding means which performs a memory protective checking when the input/output control unit issues a process request to the memory unit, together with a memory protective checking; the memory control method including issuing a predetermined processing command to be sent to the buffer memory unit from the memory control unit to the data processing unit, according to a process request held by the port and with reference to reference result from the tag copying unit; controlling the data holding state of the buffer memory unit on a store-in basis; and deciding whether a store request is sent from the input/output control unit to the memory unit, based on the memory protective check result from the memory protection deciding means; the memory control method further including the steps of issuing a store request to the memory control unit, together with a protective checking, the store request being output from the input/output control unit to the memory unit; and allowing the memory control unit to perform a reference process of the tag copying unit, in synchronism with a memory protective checking of the memory protection deciding means.

Therefore, according to the present invention, the memory control method or the memory control device can set a process request showing flag in the tag copying unit, whereby information regarding whether a block including a process request address exists in the buffer memory unit and whether the block is being processed currently are concurrently obtained by retrieving only the tag copying unit. This feature allows the address comparing circuit to be omitted, thus reducing the system constructing cost.

According to the memory control method, when the input/output control unit executes a store request to the memory unit, together with a memory protective checking, the referencing process to the store request of the tag copying unit is performed in synchronism with the memory protective checking of the memory protective deciding means. Thus, where the memory protective checking cannot inhibit an accessing or a hit or erroneous hit is found in the tag copying unit, a high speed storing operation into the storage unit can be established. Moreover, this feature enables a large processing speed, a high port-use efficiency, and a large system throughput.

BRIEF DESCRIPTION OF THE DRAWINGS

FIG. 17 is a time chart used for explaining the operation of a conventional information operation system.

DESCRIPTION OF THE PREFERRED EMBODIMENTS

Referring to the attached drawings, explanation one aspect of the present invention will be made below.

Figure 1:
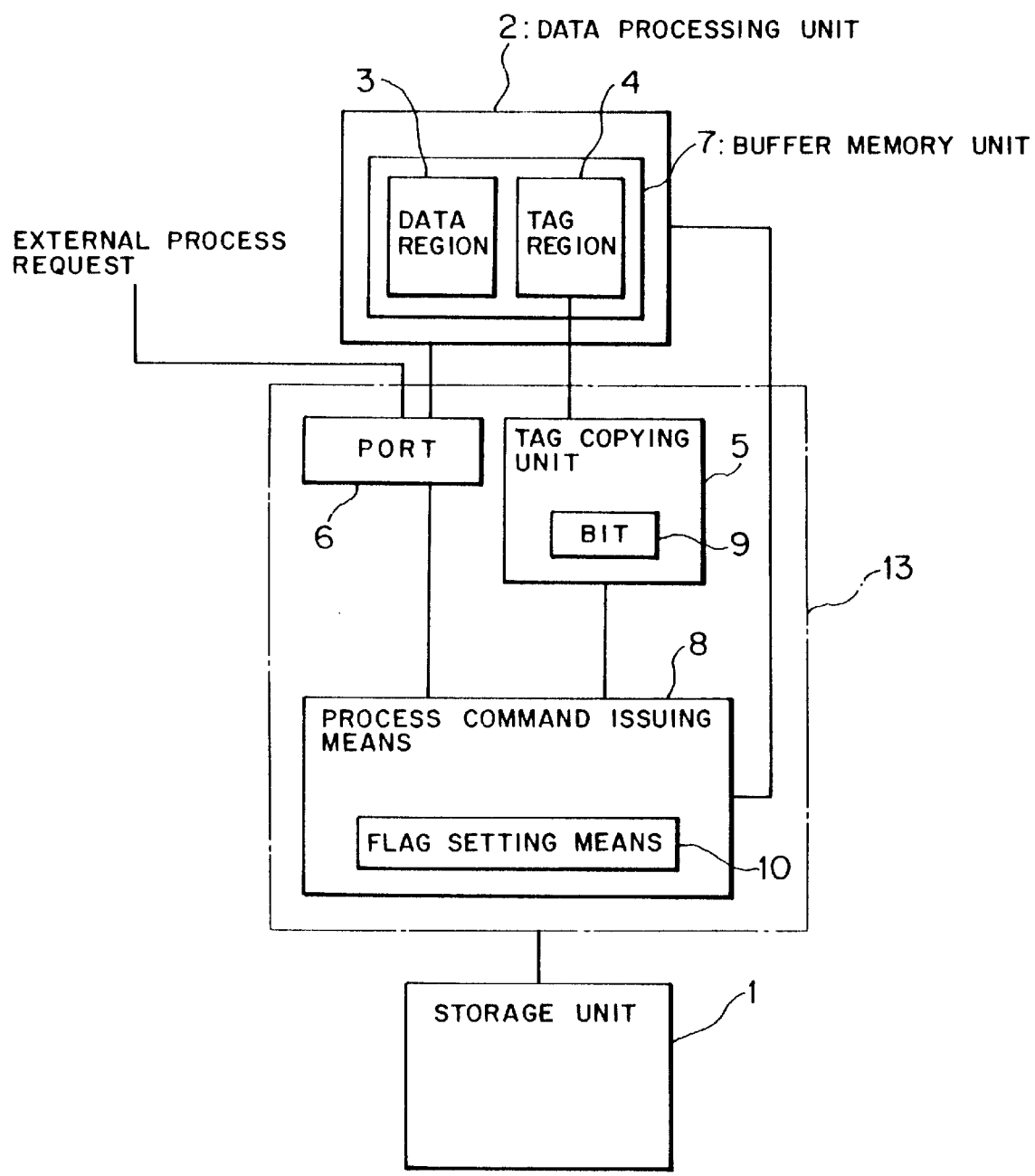
FIG. 1 is a block diagram showing one aspect of the present invention.

FIG. 1 is a block diagram showing an aspect of the present invention. In the information processing system shown in FIG. 1, numeral 1 represents a data storage unit and 2 represents at least one of data processing units. The data processing unit 2, which operates according to data stored in the storage unit 1, includes a buffer memory unit 7.

The buffer memory unit 7 includes a data region 3 that holds a piece of data stored in the memory unit 1 and a tag region 4 that holds tag information including the address of data stored in the data region 3.

The memory control unit 13 controls a data transfer between the storage unit 1 and the buffer memory unit 7 on a store-in basis. The memory control unit 13 includes a tag copying unit 5, a port 6, and a process command issuing means 8.

The tag copying unit 5 holds a part or all of copies in the tag region 4 arranged in the buffer memory unit 7. The port 6 holds a process request from the data processing unit 2 or an external process request. The process command issuing means 8 refers the tag copying unit 5 and then issues a predetermined process command to the buffer memory unit 7 sent to the data processing unit 2 according to a process request held in the port 6.

A bit 9 is arranged in the tag copying unit 5 to set a flag showing a process under request to the buffer memory unit 7. The process command issuing means 8 includes flag setting means 10 that issues a predetermined process command to be sent to the buffer memory unit 7 to the data processing unit 2 and sets at the same time a flag showing a process under request to the bit 9 in the tag copying unit 5 corresponding to a predetermined process command.

Moreover, with the buffer memory unit 7 including plural ways managed on a set-associative basis, the tag copying unit 5 has flag setting bits arranged respectively to plural ways.

The process command issuing means 8 includes port releasing means which releases the port 5 which holds a process request causing an issuance of a predetermined process command at the same time when a predetermined process command sent to the buffer memory unit 7 is issued to the data processing unit 2; and flag resetting means which resets a flag of the tag copying unit 5 corresponding to the process completion report when the process completion report is received from the data processing unit 2 in response to a predetermined process command.

The process command issuing means 8 can issue a predetermined process command to be sent to the buffer memory unit 7 to the data processing unit 2, on condition that all flags of the portion to be processed under a predetermined process command in the tag copying unit 5 are in a reset state.

The next process of a process request starts on condition that the flag reset means resets all the flags set in the tag copying unit 5 at an issuance of a predetermined process command.

The process command issuing means 8 includes a counter that sets the number of responses to be issued, as non-response number, from the data processing unit 2 according to the predetermined process command at the same time when a predetermined process command is issued to the buffer memory unit 7, and subtracting means that subtracts the non-response number from the counter every time when the data processing unit 2 receives a process completion report as a response to a predetermined process command. The next process of the process request can be started at the time when the counter counts non-response number of zero.

According to the first and second aspects of the invention, the memory control unit 13 issues a predetermined request to the buffer memory unit 7 within the data processing unit 2 while it refers the tag copying unit 5 according to the process request held in the port 6, thus controlling the data holding state of the buffer memory unit 7 on a store-in basis. A predetermined process command to be sent to the buffer memory unit 7 is issued to the data processing unit 2 while a flag which shows a process request to a portion in the tag copying unit 5, the portion to be processed under the predetermined process command, is set to the bit 9 in the tag copying unit 5. Thus information on whether a block including a process request address exists in the buffer memory unit 7 as well as information on whether the block is now in a process request can be obtained simultaneously by retrieving the tag copying unit 5. Hence, the address comparing unit can be omitted because of no address comparison.

The buffer memory unit 7, which has plural ways managed on a set-associative basis, sets a flag to the tag copying unit 5 in every way so that whether a process is being required in each way can be managed.

Furthermore, since the port 6 does not need to hold the process request until a response completion, a predetermined process request is issued to the buffer memory unit 7 via the data processing unit 2 while the port releasing unit can release the port 6 which holds a process request causing an issuance of the predetermined command.

When the flag resetting means receives a process completion report from the data processing unit 2 in response to a predetermined process command, it resets the flag of the tag copying unit 5 corresponding to the process completion report. The process command issuing means 8 issues a predetermined process command to the buffer memory unit 7, on condition that all the flags of the portions corresponding to the predetermined process command in the tag copying unit 5 are in a reset state. The next process of the process request starts, on condition that the flag resetting means has reset all the flags set in the tag copying unit 5 at an issuing time of the predetermined process request, in response to a process completion report.

Moreover, a counter sets the number of responses, as a non-response number, to be sent from the data processing unit 2 in response to a predetermined process command at the same the when the process command issuing means issues a predetermined process command to the buffer memory unit 7. The subtracting means subtracts the non-response number counted by the counter every time the process command issuing means receives a process request in response to a predetermined process request. When the non-response number reaches zero, the process command issuing means controls to start the next process of the process request. Hence the next process can be immediately started according to the condition of the response from the data processing unit 2.

According to the memory control method or the memory control device according to the present invention, since a flag showing under a process request can be set in the tag copying unit 5, both the presence or absence of a process request address including block in the buffer memory unit 7 as well as the current process condition of a block can be grasped by retrieving only the tag copying unit 5. Hence there is an advantage in that the address comparison can be omitted, whereby the system constructing cost can be reduced.

According to the memory control method or the memory control device, a predetermined process request to be sent to the buffer memory unit 7 is issued to the data processing unit 2 while the port which holds the process request causing the issuance of the predetermined process command can be released. Hence the address holding operation is not needed till the data processing unit 2 completes the response operation. Hence the improved port-use efficiency can increase the throughput without increasing the number of ports. Hence there is an advantage in that the amount of hardware can be reduced so that the system constructing cost can be largely decreased.

Furthermore, according to the memory control method or the memory control device, the next process can be started according to the response condition to a process request, whereby the throughput can be realized advantageously.

Figure 2:
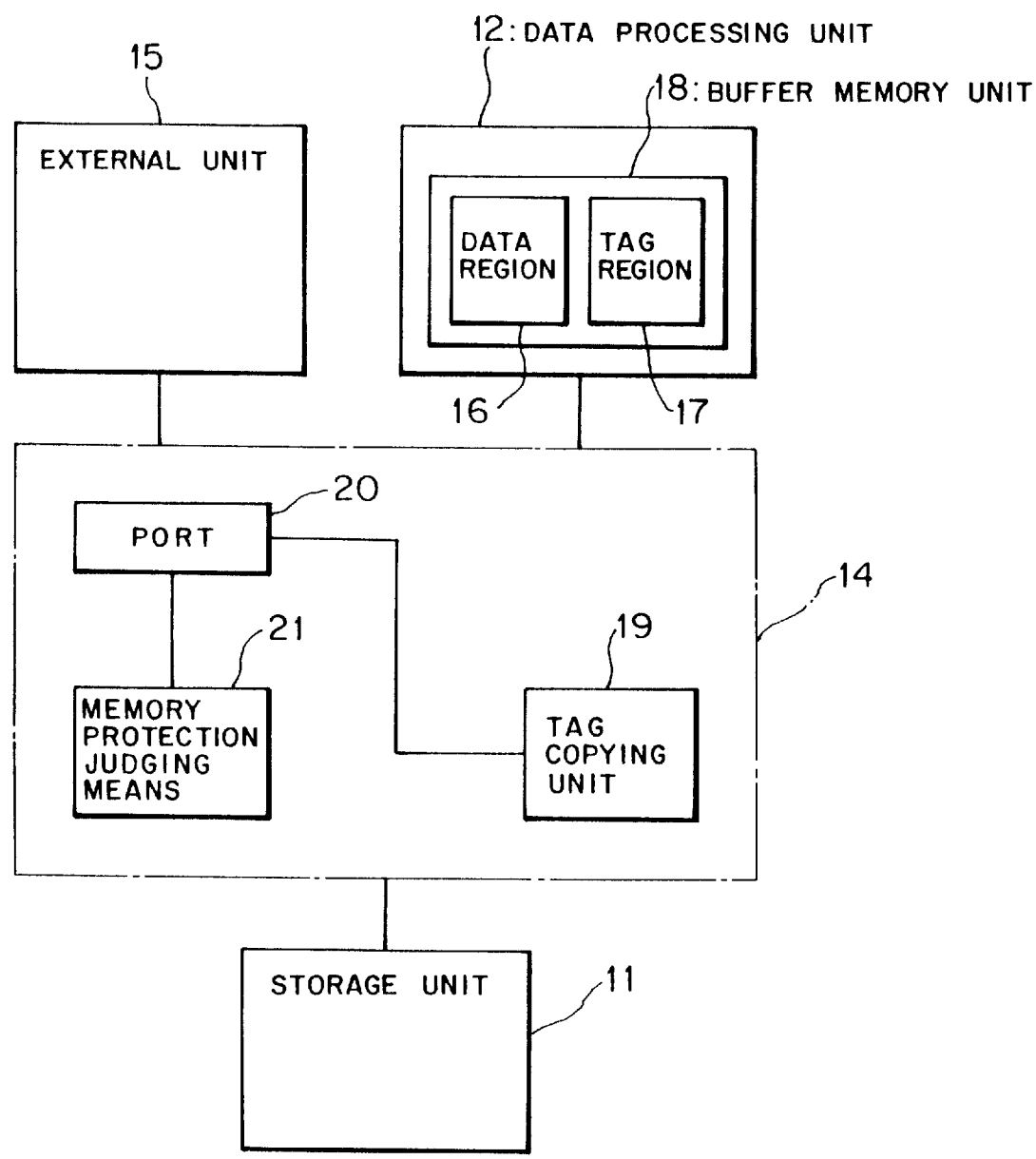
FIG. 2 is a block diagram showing a second aspect of the present invention.

FIG. 2 is a block diagram showing a second aspect of the present invention. Referring to FIG. 2, the information processing system includes a storage unit 11 for storing data, at least one of data processing units 2 that operates according to the data from the storage unit 11, an input/output control unit 15 that issues a store request to the storage unit 11, together with a memory protection checking command, and a memory control unit 14.

Each data processing unit 12 includes a buffer memory unit 18 which consists of a data region 16 which holds a pieces of data stored in the storage unit 11, and a tag region 17 which holds tag information including the address of data held in the data region 16.

The memory control unit 14 includes a tag copying unit 19 and a port 20, and memory protection deciding means 21.

The tag copying unit 19 holds a part or all of the copy of the tag region 17 arranged in the buffer memory unit 18. The port 20 holds a process request issued from the data processing unit 12 or the input/output control unit 15. The memory protection deciding means 21 performs a memory protection checking operation when it receives a store request associated with a memory protection checking command from the input/output control unit 15, to the memory unit 11. The memory control unit 14 issues a predetermined process request sent to the buffer memory unit 18 to the data processing unit 12, based on the comparison result from the tag copying unit 18 in response to the process request held in the port 20.

The memory control unit 14 controls the data transfer between the storage unit 11 and the buffer memory control unit 18 on a store-in basis, and allows a store request to be transferred from the input/output control unit 15 to the storage unit 11, according to the result of the memory protection checking from the memory protection deciding means 20.

According to the second aspect of the present invention, when the input/output control unit 15 outputs a store request associated with a memory protection checking to be sent to the storage unit 11 to the memory control unit 14, the tag copying unit 19 performs a referencing process, in synchronism with the memory protection checking operation of the memory protection deciding unit 21.

According to the second aspect of the present invention, the memory control unit 14 issues a predetermined process command to the buffer memory unit 18 arranged in the data processing unit 12, based on the reference result from the tag copying unit 19 in response to the process request held in the port 20. The memory control unit 14 also controls the data holding state of the buffer memory unit 18 on a store-in basis and decides whether a store request is issued from the input/output deciding means 21 to the storage unit 11, based on the result of the memory protection checking operation from the memory protection deciding means 21.

Where the input/output control unit 15 issues a store request to be sent to the storage unit 11 to the memory control unit 14, the store request being associated with a memory protection checking command, the referencing process of the tag copying unit 19 is performed in synchronism with the memory protection checking operation of the memory protection deciding means 21. Hence the process time during which the memory protection checking approves accessing (a store request) can be shortened.

According to the memory control method, when the input/output control unit 15 issues a store request to the storage unit 11, together with a memory protection checking request, the referencing process of the tag copying unit 19 on the store request is performed in synchronism with the memory protection checking operation of the memory protection deciding means 21. Hence, where the memory protection checking operation does not inhibit accessing, a hit or erroneous hit is found in the tag copying unit 19, the storage unit 11 can perform a high speed storing operation, whereby the use efficiency of the port can be improved. Hence there is an advantage in that the above-mentioned procedure contributes largely to an improved system throughput.

Explanation of First Embodiment

Figure 3:
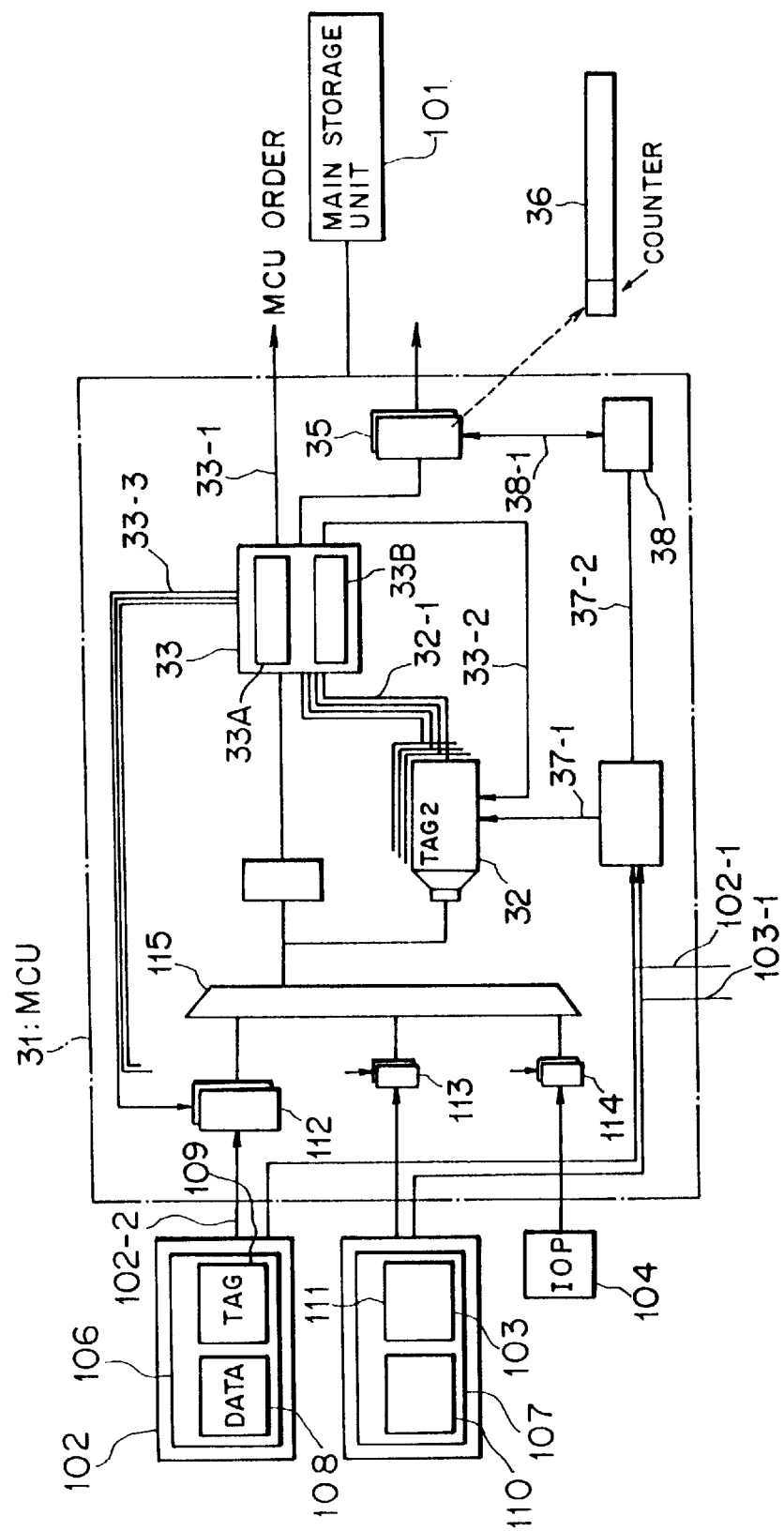
FIG. 3 is a diagram showing the first embodiment according to the present invention.
Figure 12:
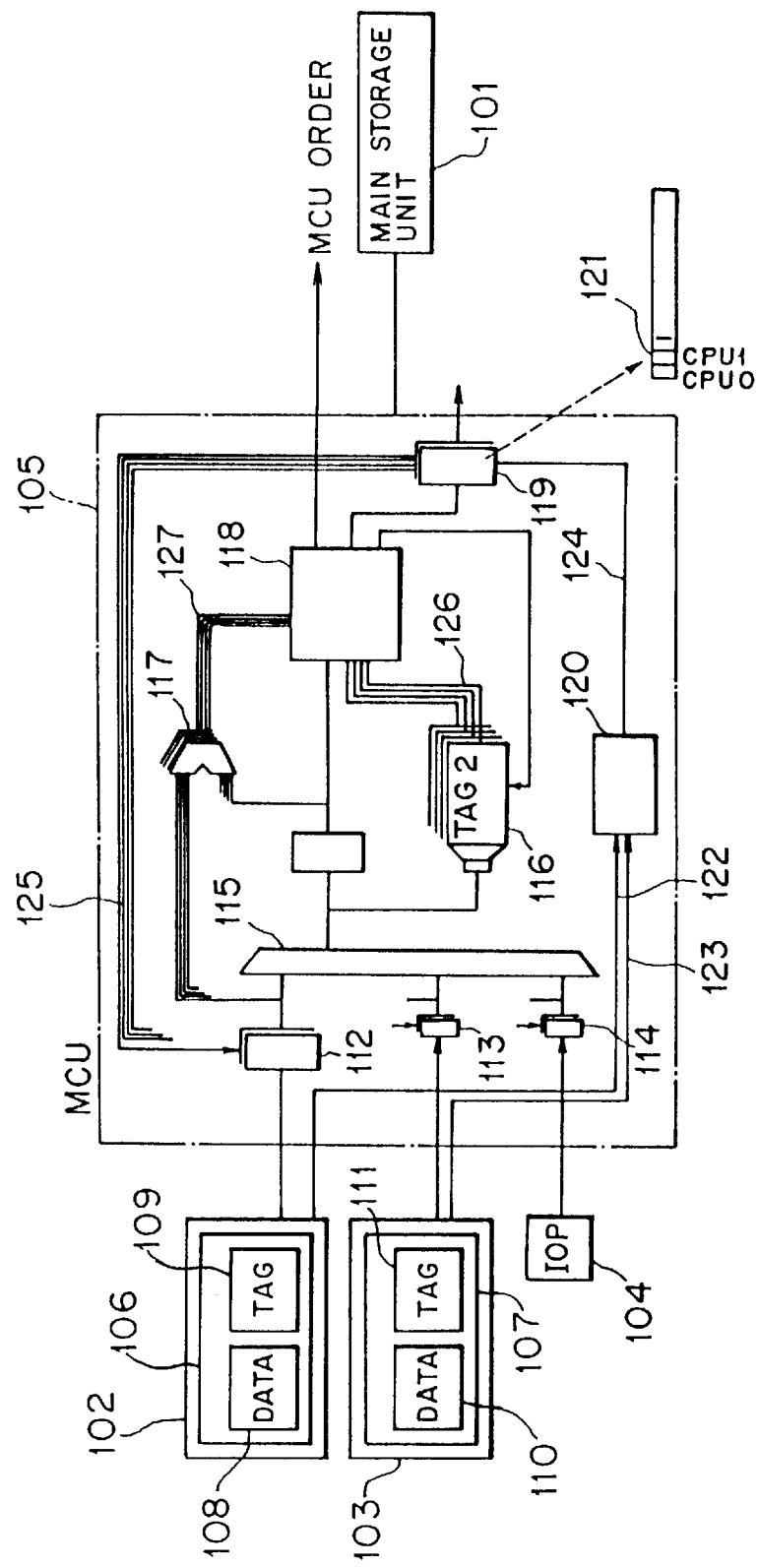
FIG. 12 is a block diagram showing a conventional information processing system.

An embodiment of the present invention will be explained below with reference to the attached drawings. FIG. 3 is a block diagram showing the first embodiment according to the present invention. Referring to FIG. 3, the information processing system includes a main storage unit (MSU) 101, two data processing units (central processing units (CPUs)) 106 and 107, and an input/output control unit (IOP) 104. The above elements have functions similar to the corresponding elements shown in FIG. 12.

The main storage unit 101 stores data. The data processing units 106 and 107 can execute concurrently a parallel data operating process. The data processing unit 106 includes a data region that holds a piece of data stored in the main storage unit 101 and a tag region 109 that holds tag information holding tag information with the address of data held in the data region 108. The data processing unit 107 includes a data region that holds a piece of data stored in the main storage unit 101 and a tag region 111 that holds tag information holding tag information with the address of data held in the data region 110.

The buffer memory unit 106 in the data processing unit 102 is managed, for example, on a 4-way set-associative basis. The buffer memory unit 107 in the data processing unit 103 is managed, for example, on a 4-way set-associative basis.

Furthermore, the input/output control unit 104 outputs a process request (process command) to be issued to the external processing units 102 and 103 to the memory-control unit 31 (to be described later).

Figure 13:
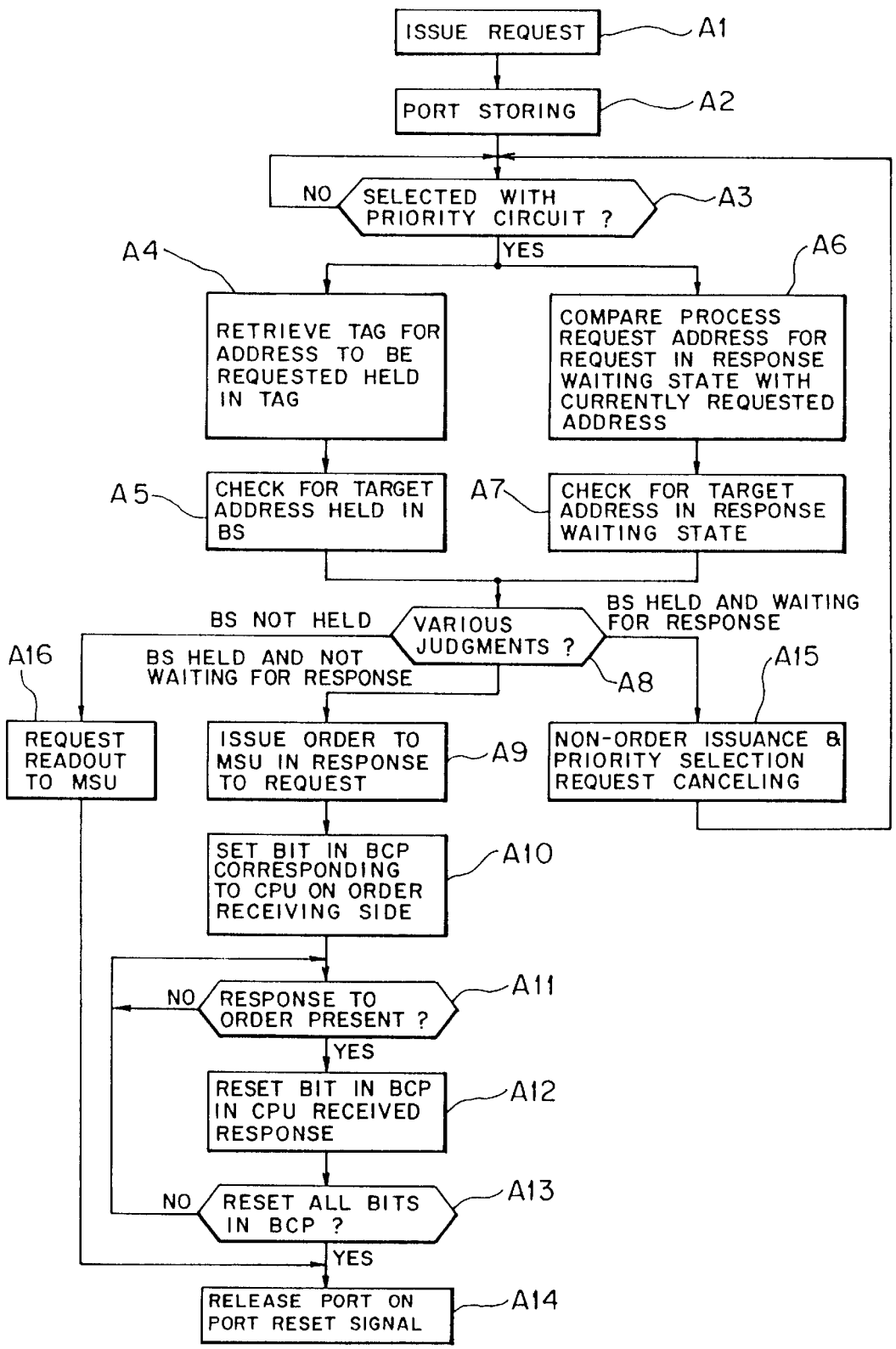
FIG. 13 is a flow chart used for explaining the operation of a conventional information system.
Figure 14:
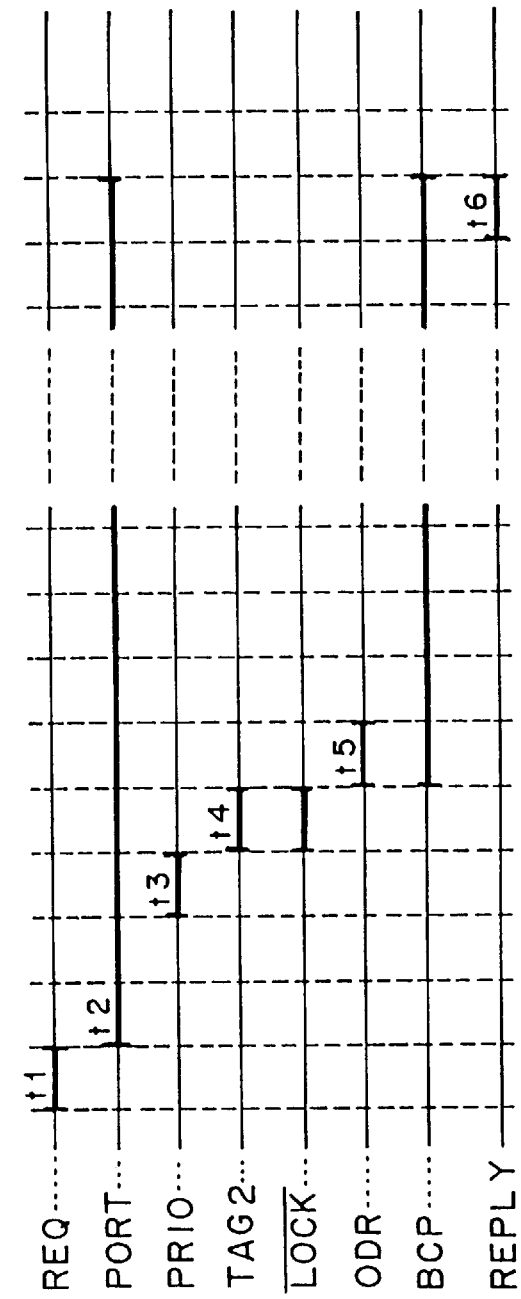
FIG. 14 is a flow chart used for explaining the operation of a conventional information system.

Numeral 31 represents a memory control unit (MCU) that controls the data transfer between the main storage unit 101 and the buffer memory unit 106 or 107 on a store-in basis. Like the memory control unit 105 shown in FIG. 13, the memory control unit 31 includes acceptance ports 112 to 114 and a priority circuit 115.

The acceptance port 112 stores an external process command input from the data processing unit 102. The acceptance port 113 stores an external process command input from the data processing unit 103. The acceptance port 114 stores an external process command input from the input/output control unit 104. The priority circuit 115 outputs selectively any one of the processing commands from the acceptance ports 112 to 114.

Numeral 32 represents a second tag region. The second tag regions (tag copying units) 32 hold a copy of a part or all of the tag region 109 in the buffer memory unit 106 and a copy of a part or all of the tag region 111 in the buffer memory unit 107, respectively.

Figure 4:
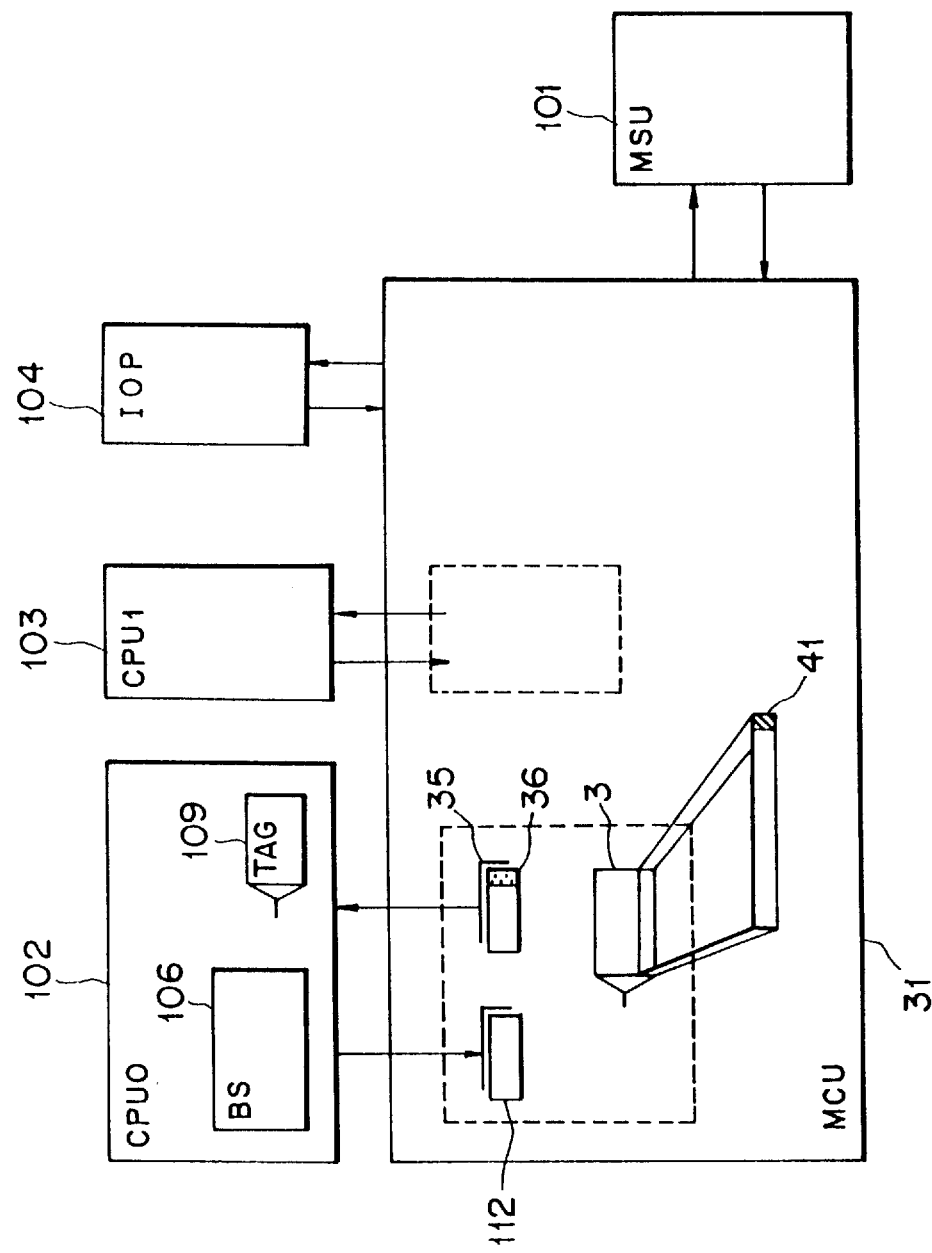
FIG. 4 is a diagram showing the outline of an information processing system according to the first embodiment of the present invention.
Figure 5:
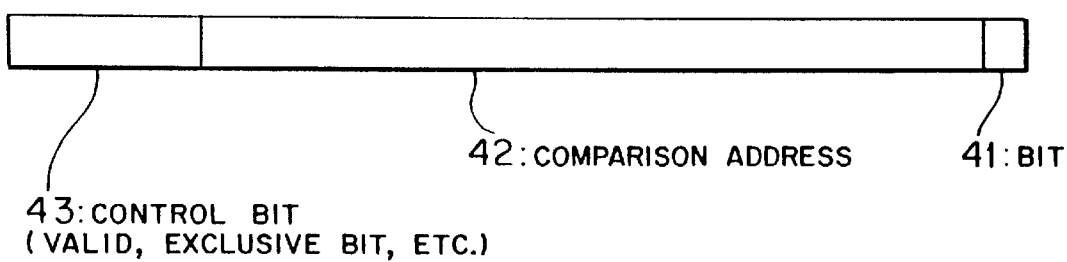
FIG. 5 is a diagram showing the entry configuration of the second tag unit according to the first embodiment of the present invention.

For example, where the buffer memory units 106 and 107 include four-ways managed on a set-associative basis, the second tag region 32 includes four ways, each having a flag setting bit (refer to numeral 41 in FIGS. 4 and 5).

Numeral 33 represents order issuing means (or process command issuing means). The order issuing means 33 references the second tag region 32 in response to the tag retrieval result reporting signal 32-1, according to a process command held in each of the acceptance ports 112 to 114, and then issues a predetermined process command (order) 33-1 to be sent respectively to the buffer memory units 106 and 107, in the data processing units 102 and 103.

As shown in FIGS. 4 and 5, a bit 41 being under a process request to the buffer memory units 106 and 107 is set to each of the entries in the second tag region 32 (to "1" at a flag setting time).

The order issuing unit 33 also includes a flag setting function unit (flag setting means) 33A which issues a process request to the buffer memory unit 106 or 107 to the corresponding data processing unit 102 or 103 while it outputs a flag setting control signal 33-2 to the second tag region 32, whereby a flag "1" showing under a process request is set to the bit 41 of the portion (entry) of interest in the second tag region 32.

The order issuing unit 33 includes a port releasing unit (port releasing means) 33B that outputs the port reset signal 33-3, together with the flag setting control signal 33-2, thus releasing one of the ports 112 to 114 holding a process command.

The entry of each of the second tag regions 32, as shown in FIG. 5, includes a comparison address portion 42 to be compared and a control bit 43 such as valid and exclusive, in addition to the flag 41.

Numeral 37 represents a responding circuit (flag resetting means). When the responding circuit 37 receives the response 102-1 from the data processing unit 102 and the response 103-1 from the data processing unit 103 according to the process command already processed in the order issuing unit 33, it outputs a flag reset signal 37-1 to the second flag unit 32. Thus the flag of the way of interest is reset while the process completion report 37-2 is output to the counter subtracting circuit 38 (to be described later).

The order issuing unit 33 issues the buffer memory unit 106 or 107 to the corresponding data processing unit 102 or 103, on condition that all the flags of the portions corresponding to a predetermined process command in the second tag region 32 have been reset.

The memory control unit 31 starts the next process of a process request, on condition that the response processing circuit 37 has reset all flags set to the second tag region 32 when the previous process command is issued.

Numeral 35 represents a response waiting control port (BCP). The response waiting control port 35 includes a counter 36 that sets the number of responses, as non-response number, to be issued from the data processing unit 102 or 103, or a process command issuing source, corresponding to a process command.

Numeral 38 represents a counter subtracting circuit (subtracting means). The counter subtracting circuit 38 outputs a signal 38-1 to the response waiting control port 35 every time the process completion report 37-2 as a response signal from the data processing unit 102 or 103 is received from the response processing circuit 37, thus subtracting the number of responses not counted by the counter 36.

The operation of the above configuration according to the first embodiment of the present invention will be described below with reference to the flow chart shown in FIG. 6 and the timing chart shown in FIG. 7.

Figure 6:
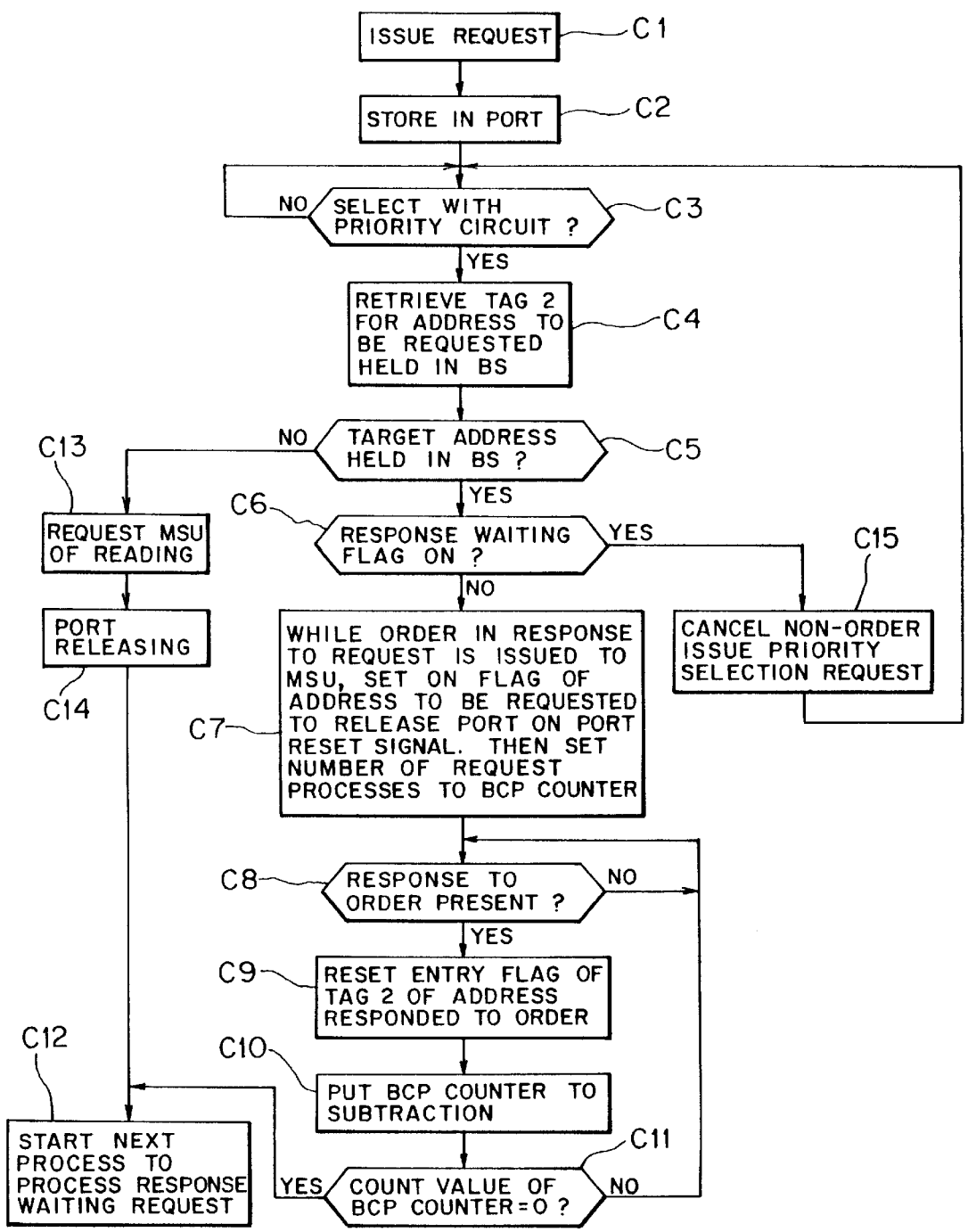
FIG. 6 is a flowchart used for explaining the operation of the information processing device according to the first embodiment of the present invention.
Figure 7:
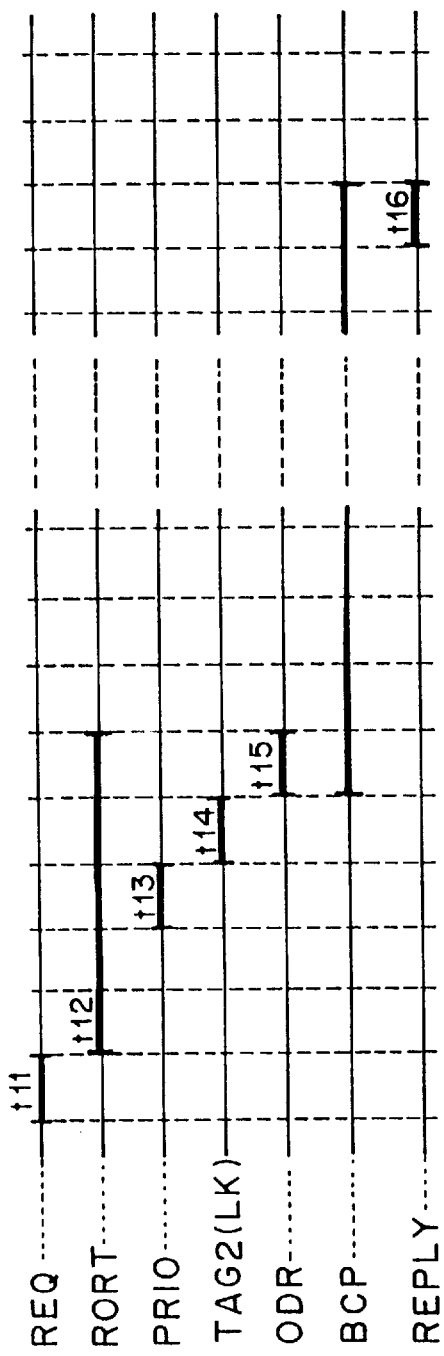
FIG. 7 is a timing chart used for explaining the operation of the first embodiment according to the present invention.

When the data processing unit 102, for example, outputs a process command 102-2 (refer to FIG. 3) (refer to the step C1 in FIG. 6 and the duration t11 in FIG. 7), the memory control unit 31 stores the process command 102-2 in the acceptance port 112 (refer to the step C2 in FIG. 6 and the duration t12 in FIG. 7).

When the priority circuit 115 selects a process request 102-2 (refer to YES route in the step C3 in FIG. 6 and the duration t13 in FIG. 7), it retrieves the second tag region 32 using the address corresponding to the process command (refer to the step C4 in FIG. 6 and the duration t14 in FIG. 7) to report the order issuing unit 33 of the retrieval result as a tag retrieval result reporting signal 32-1.

The tag retrieval result reporting signal 32-1 includes a signal showing whether a process command address including block exists in the buffer memory units 106 and 107 and a signal showing whether a block storing way is in a process request waiting state (a signal corresponding to a flag set in the bit 41).

When the process command address including block does not exist in the buffer memory units 10 and 107, a reading request is issued to the main storage unit 101 (or from the NO route in the step C5 to the step C13 in the FIG. 6) so that the acceptance port 112 is released (in the step C14 in FIG. 6). Then the next process of the process response waiting request is started (the step C12 in FIG. 6).

With a process command address including block stored in the buffer memory unit 106 or 107 (refer to YES route from the step C5 in FIG. 6) and a response waiting flag in the bit 41 being in ON state, where the address corresponding to the process command is in a process request waiting state, an order is not issued so that the process command is canceled. Since the port reset signal 33-3 is not issued, the content of the port 112 is not reset. Hence till the priority circuit 115 selects again the process command, the acceptance port 112 queues by (the step C15 in FIG. 6).

With a process command address including block existing in the buffer memory unit 101 or 107, a response waiting flag 41 in an OFF state, and the address corresponding to the process command being not in a process request waiting state (NO route from the step C6 in FIG. 6), the order issuing unit 33 selects the corresponding buffer memory unit 106 or 107 to issue the order 33-1 (refer to the duration t15 in FIG. 7). At the same time, the flag setting unit 33A within the order issuing unit 33 outputs the flag setting control signal 33-2 to set a flag "1" showing being under a process request to the bit 41 of a portion of interest in the second tag region 32. The port releasing unit 33B within the order issuing unit 33 issues the port reset signal 33-3 to release the port 112 holding the process request, thus setting the number of issued orders to the counter 36 within the response waiting control port 35 to set the order number information to the waiting control port 35 (step C7 in FIG. 6). The acceptance port 112 now released can accept a new request.

Thereafter, when the memory control unit 31 receives the responses 102-1 and 103-1 with respect to an order (YES route from the step C8 in FIG. 6), the response processing circuit 37 decides that the response has come from the data processing unit 102 or 103 to output the flag reset signal 37-1 to the second tag region 32, thus resetting a flag of a way of interest (in the step C9 in FIG. 6) while it outputs the process completion report 37-2 as a counter subtraction command to the counter subtracting circuit 38. The counter subtracting circuit 38 subtracts the count value of the counter 36 (refer to the numeral 38-1 in FIG. 3 and the step C10 in FIG. 6).

The counter 36 counting "0" (refer to YES route in the step C11 in FIG. 6 and the duration t16 in FIG. 7) means the responses to all orders issued on a process command. Then the flow goes to the step C12 to continue the process in accordance with the content held in the response waiting control port 35.

According to the first embodiment of the present invention, the flag setting unit 33A can set a flag showing a process request to the bit 41 in the second tag region 32. Whether a process request address including block exists in the buffer memory units 106 or 107 and whether the block now is being processed can be recognized concurrently by retrieving the second tag unit 32, whereby an exclusive address comparing circuit is not needed. Hence there is an advantage in that the system construction cost can be reduced.

A predetermined process request to the buffer memory unit 106 or 107 is issued to the data processing unit 102 or 103 while the port releasing unit 33B can release the port 114 which holds a process request causing the predetermined process command. It is unnecessary to hold the address till the data processing unit 102 and 103 issue responses. Hence the use efficiency of the acceptance ports 112 to 114 can be improved. The improved throughput can be realized without increasing the number of ports. Hence there is an advantage in that the amount of hardware as well as the system construction cost can be largely reduced.

According to the present invention, the next process of the process request can be started according to the response state to a process request. Hence a sharply increased throughput can be realized.

According to the present invention, two data processing units and the buffer memory unit with four ways are used. However, according to the present invention, the data processing units and the number of ways of the buffer memory unit should not be limited to a specific number, respectively. The data processing units and the buffer memory unit can be applied in a desired number, respectively.

Explanation of Second Embodiment

Figure 8:
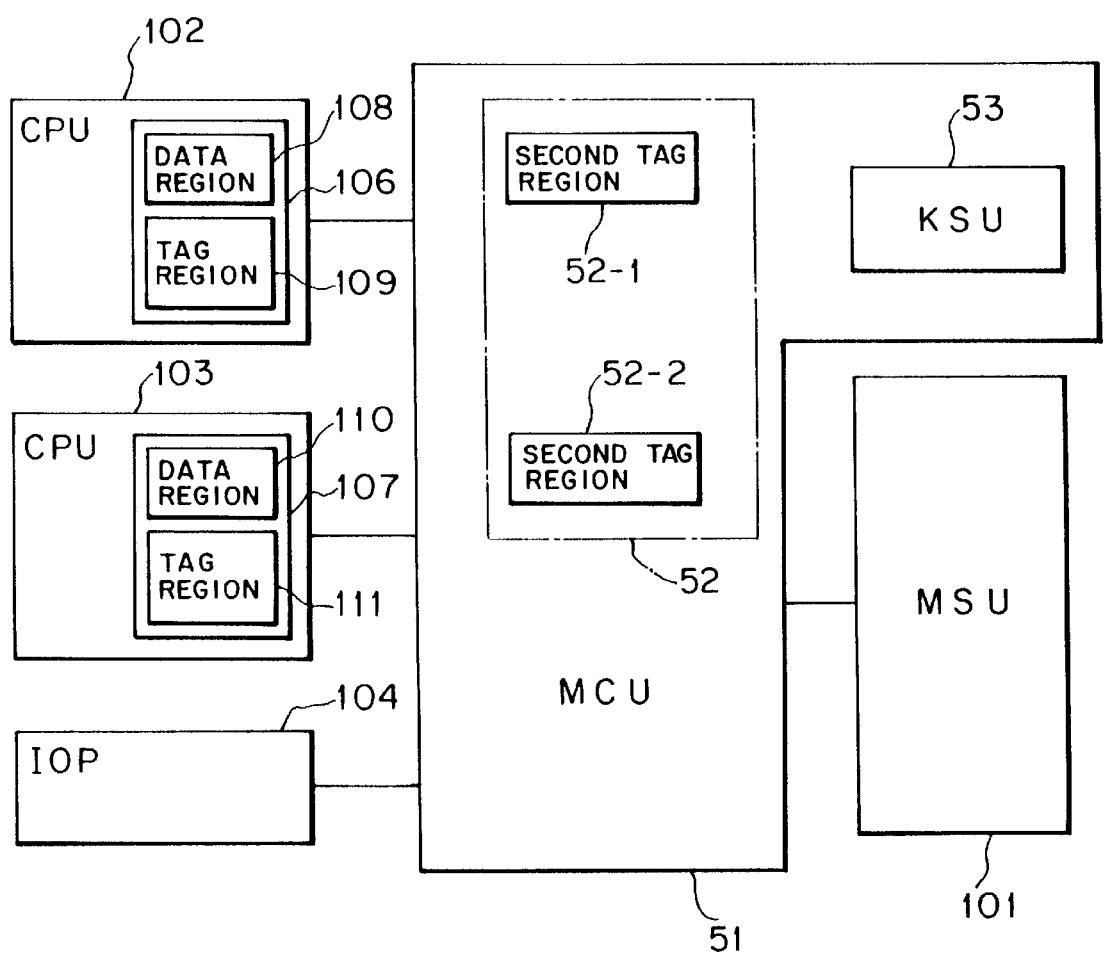
FIG. 8 is a functional diagram showing the second embodiment according to the present invention.

FIG. 8 is a block diagram showing the second embodiment according to the present invention. Referring to FIG. 8, the information processing system includes two data processing units (CPUs) 102 and 103, an input/output control unit (IOP) 104, a memory control unit (MCU) 51, and a main storage unit (MSU) 101. A memory protection checking (where a store request is made to the data unit smaller than the minimum move-out unit of the buffer memory unit 106 or 107 (hereinafter the process request is referred to as a request A)) can be performed to a store request with a memory protection check which is issued from the input/output control unit 104 to the main storage unit 101 via the memory control unit 51.

The main storage unit 101 and two data processing units 102 and 103, and the input/output control unit 104 have functions in a manner similar to those in the first embodiment. The data processing unit 102 includes a buffer memory unit 106 which consists of the data region 108 and the tag region 109. The data processing unit 103 includes a buffer memory unit 107 which consists of the data region 110 and the tag region 111.

In the memory control unit 51, the second tag region (tag copying unit) 52 holds a part or all of a copy of the tag region 109 in the buffer memory unit 106 and a part or all of a copy of the tag region 111 in the buffer memory unit 107. The second tag region 52-1 holds a copy of the tag region 109 and the second tag region 52-2 holds a copy of the tag region 111.

Numeral 53 represents a memory protection key storing unit (KSU). The memory protection key storing unit 53 stores data which is used to execute a memory protection checking in response to a process request from the input/output unit 104.

Figure 9:
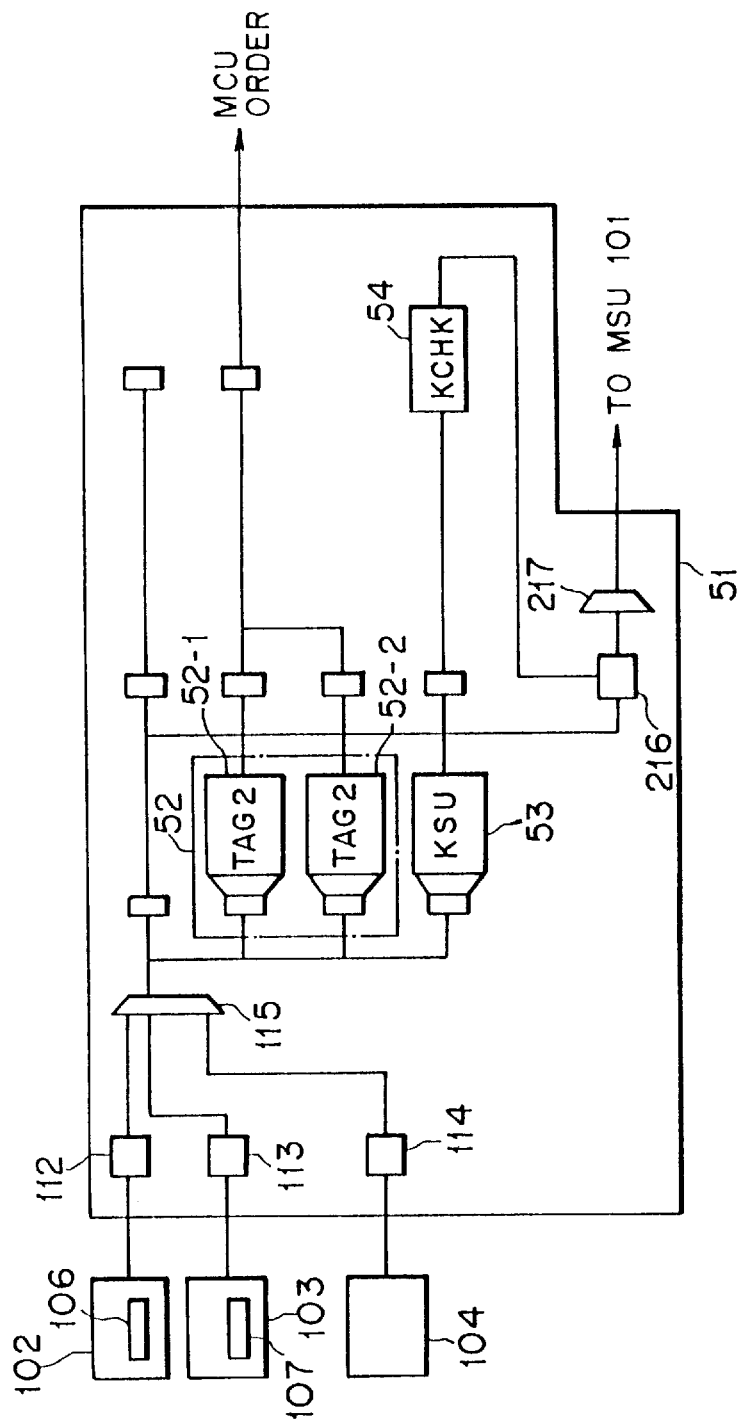
FIG. 9 is a block diagram showing the detail configuration of the memory control unit according to the second embodiment of the present invention.
Figure 15:
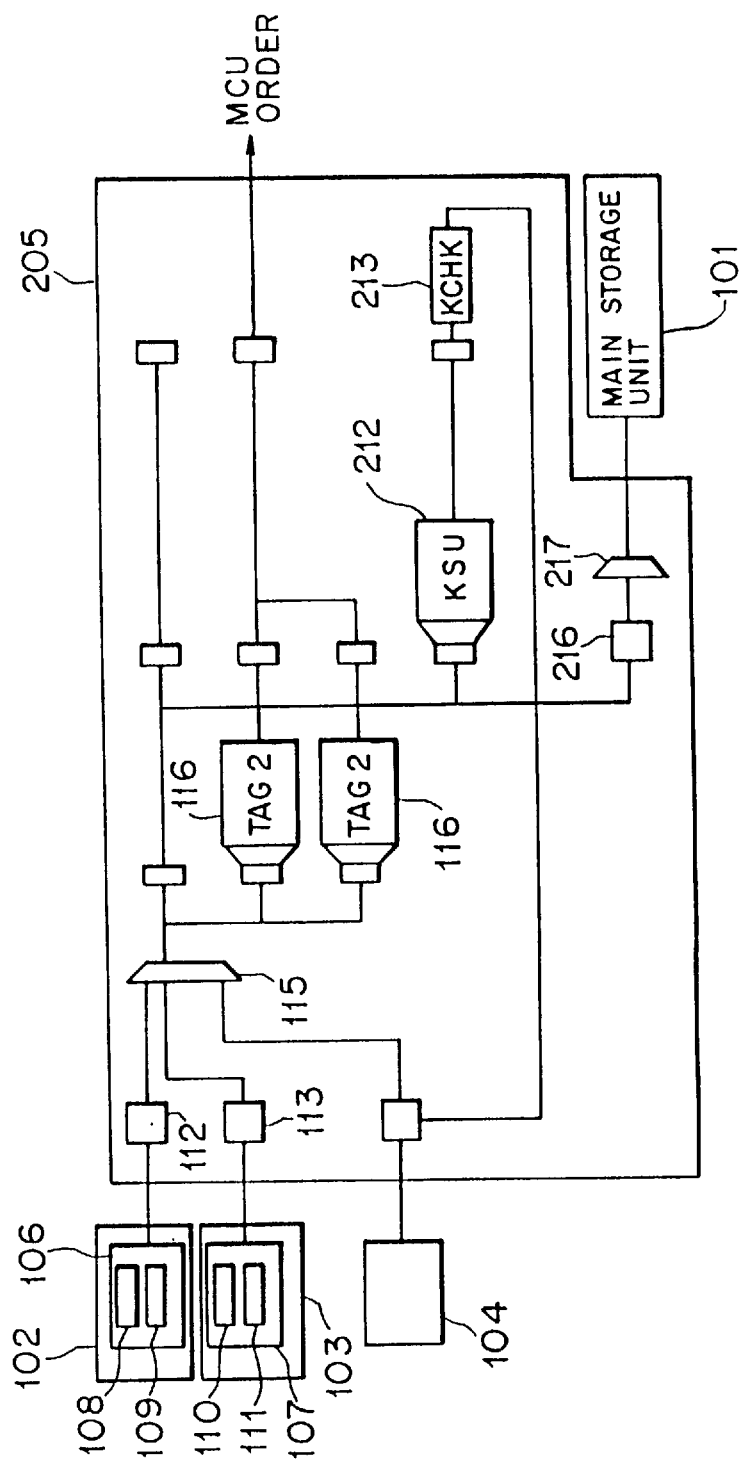
FIG. 15 is a block diagram showing a conventional information processing system.
Figure 16:
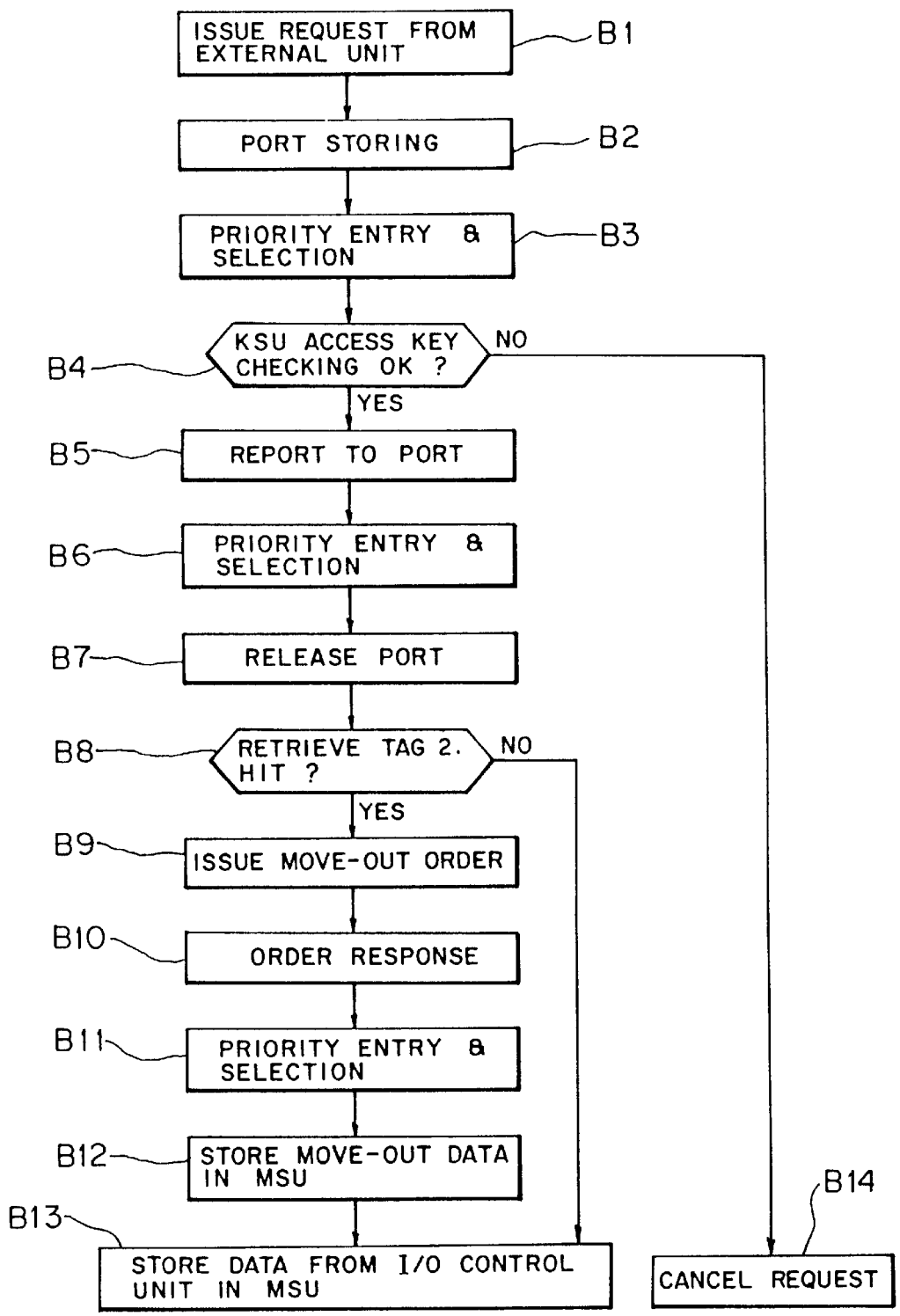
FIG. 16 is a flow chart used for explaining the operation of a conventional information processing system.

According to the present embodiment, the memory control unit 51 has the configuration shown in FIG. 9. The memory control unit 51 includes the second tag region 52 described above, the memory protection key storing unit 53 described above, acceptance ports 112 to 114 being functionally similar to that in the memory control unit 205 in FIG. 15, a priority circuit 115, a queue 216, and a priority circuit 217. A predetermined process command such as a move-out order to be sent to the buffer memory unit 106 is issued to the data processing unit 102, together with the associated order number, according to process requests respectively held the acceptance ports 112 to 114 and based on the reference result from the second tag region 52. A predetermined process command such as a move-out order to be sent to the buffer memory unit 107 is issued to the data processing unit 103, together with the associated order number, according to process requests respectively held in the acceptance ports 112 to 114 and based on the reference result from the second tag region 52. In addition, as described later with reference to FIGS. 10 and 11, when the acceptance port 114 holds the request A from the input/output control unit 104 is held by the acceptance port 114 and then selected by the priority circuit 115, the retrieving process (referencing process) of the second tag region 52 can be performed in synchronism with the memory protection checking of the memory protection checking circuit 54, thus releasing the acceptance port 114. The address and the key-checking key in the data block to be subjected to the request A move together with an order issued from the memory control unit 51 or a response issued from the data processing unit 102 or 103 corresponding to the order.

The memory control unit 51 also includes, the memory protection checking circuit (KCHK) 54, or memory protection deciding means, and the memory protection check information holding unit 56.

In order to perform a memory protection checking operation, the memory protection checking circuit 54 compares the key corresponding to the address of the request A obtained by accessing the memory protection key storing unit 53 with the key-checking key associated with the request A, thus checking whether the requested address is accessible.

The memory protection checking information holding unit 56 holds information showing whether or not a request causing an order issuance involves a memory protection checking operation (i.e., information showing whether or not the request is the request A), for each order number of orders attached by the memory control unit 51, as described above. When the acceptance port 112 or 113 outputs a response corresponding to the order, the memory protection checking information holding unit 56 references the order number attached to the response. If it is proved that the response has been made to the request A associated with the memory protection checking, the memory protection checking circuit 54 reads and accesses a key corresponding to the address associated with the response out of the memory protection key storing unit 53, and then compares the readout key with the key-checking key associated with the response, thus performing a memory protection checking operation.

The information showing whether an order issuance causing request is associated with a memory protection checking is held in the order of the order numbers by the memory protection checking information holding unit 56. However, the information may be associated with the order or the response to the order. In this case, the order number setting operation and the memory protection checking information holding unit 56 can be omitted.

In the memory control unit 51, like the process of the request A, when the input/output control unit 104 issues a store request to the main storage unit 101, associated with a memory protection checking command, the acceptance port 114 holds the store request.

According to the second embodiment of the present invention, the operation of the above-configuration will be described below with reference to the flowchart shown in FIG. 10 and the timing chart shown in FIG. 11.

Figure 10:
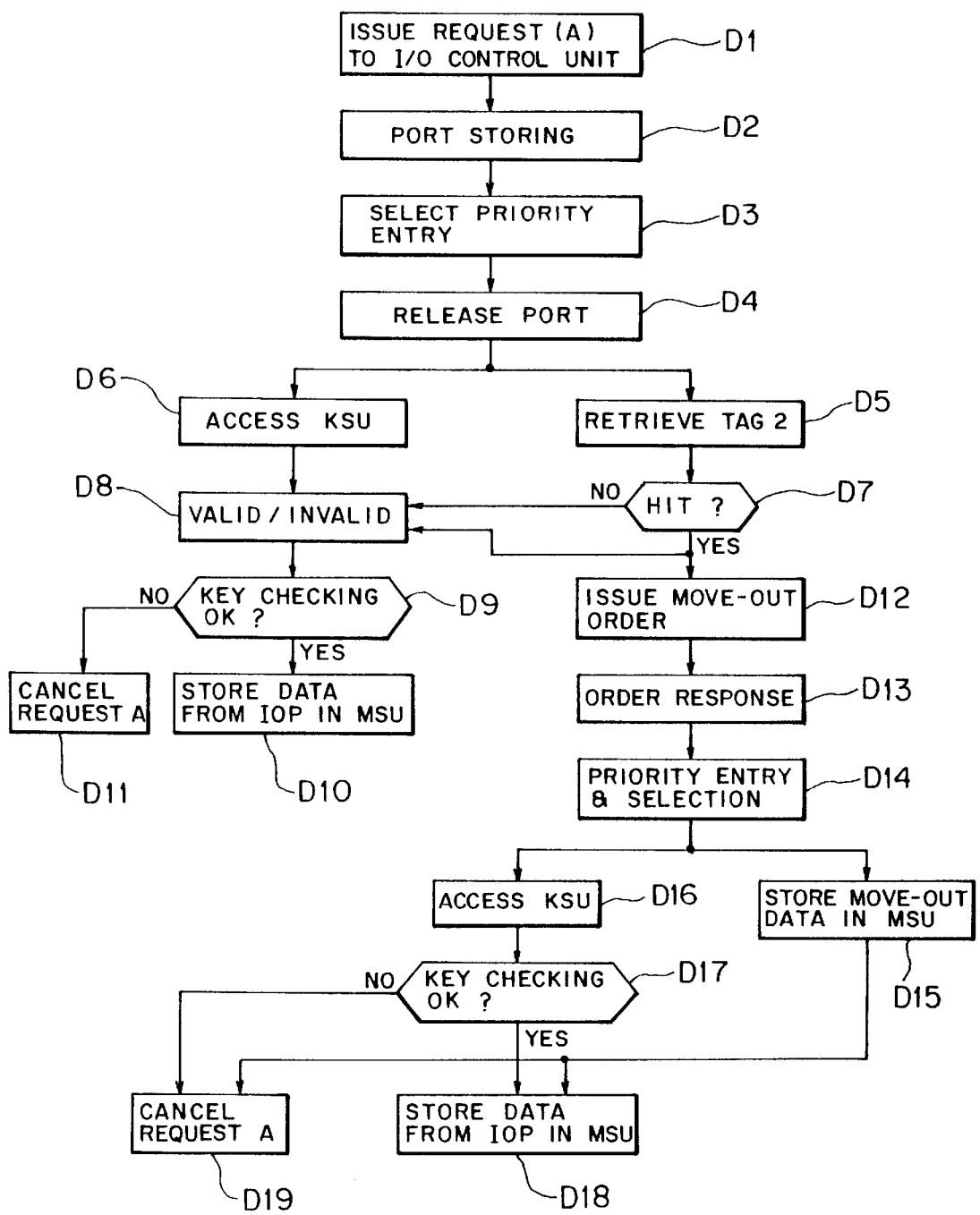
FIG. 10 is a flowchart used for explaining the operation of the second embodiment according to the present invention.
Figure 11:
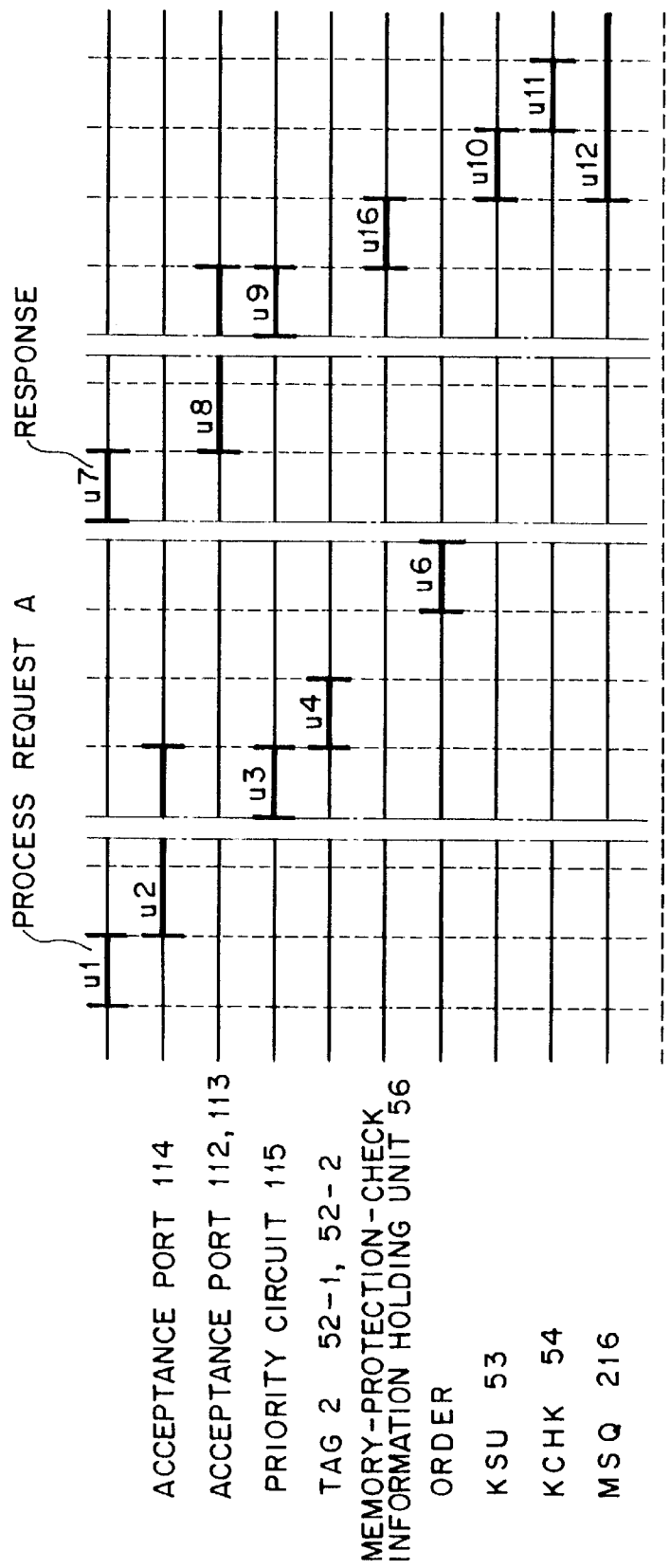
FIG. 11 is a timing chart used for explaining the operation of the second embodiment according to the present invention.

The input/output control unit 104, for example, issues the request A (refer to the step D1 in FIG. 10 and the duration u1 in FIG. 11) to store the acceptance port 114 in the memory control unit 51 (refer to the step D2 in FIG. 10 and the duration u2 in FIG. 11).

When the priority circuit 115 participates the priority selection (refer to the step D3 in FIG. 10 and the duration u3 in FIG. 11) and then selects the process request (request A) issued from the input/output control unit 104 to the memory control unit 51, together with a memory protection checking operation, the acceptance port 114 is released (step D4 in FIG. 10). With the flow started by the priority selection, the retrieving process of the second tag region 52 (refer to the step D5 in FIG. 10 and the duration u4 in FIG. 11) is performed in synchronism with an access to the memory protection key storing unit 53 (the step D6 in FIG. 10).

The second tag region 52 is retrieved immediately. The access to the memory protection key storing unit 53 takes a relatively long processing time, compared with the retrieval process of the second tag region 52.

If the second tag region 52 of the access related to the request A is erroneously retrieved (NO route in the step D5 in FIG. 10), the access to the memory protection key storing unit 53 becomes valid (the step D8 in FIG. 10) so that the memory protection checking circuit 54 performs a memory protection checking operation (the step D9 in FIG. 10).

Where the memory protection checking circuit 54 compares the key-checking key associated with the request A with the key from the memory protection key storing unit 53 and then proves the accessible state (YES route in the step D9 in FIG. 10), the main storage unit 101 stores the store data from the input/output control unit 104 (in the step D10 shown in FIG. 10). On the other hand, where the memory protection checking circuit 54 performs a memory protection checking and then proves an inaccessible state (NO route in the step D9 in FIG. 10), the reset A is canceled (the step D11 in FIG. 10).

If retrieving the second tag region 52 finds the address related to the request A (YES route in the step D7 in FIG. 10), it is regarded that an access to the memory protection key storing unit 53 is invalid (the step D8 in FIG. 10). Actually, the memory protection checking circuit 54 performs a key checking operation, according to the access result from the memory protection keying unit 53 (the step D9 in FIG. 10), and then invalidates the access by neglecting the checking result.

The memory control unit 51 issues a move-out order to the data processing unit 102 or 103 which has the latest data in the address corresponding to the request A (refer to the step D12 in FIG. 10 and the duration u6 in FIG. 11). An order number is attached to the move-out order transferred to the data processing unit 102 or 103. The memory protection check information holding unit 56 holds the instruction by which a memory protection checking is performed to the order number.

When the data processing unit 102 or 103 receives the move-out order, it invalidates the tag region 109 or 111 of the corresponding data and then issues the response to the memory control unit 51 to move out the corresponding data (the step D13 in FIG. 10 and the duration u7 in FIG. 11).

When the acceptance port 112 or 113 in the memory control unit 51 holds the response (refer to the duration u8 in FIG. 11) and the priority circuit 115 selects the same (refer to the step D14 in FIG. 10 and the duration u9 in FIG. 11), the memory protection checking information holding unit 56 is referenced (refer to the duration u16 in FIG. 11), it is decided whether or not it is instructed to subject the order number associated with the response to a memory protection checking.

Where a memory protection checking is instructed, an access to the memory protection key storing unit 53 is made (refer to the step D16 in FIG. 10 and the duration u10 in FIG. 11) while a move-out data from the data processing unit 102 or 103 is stored into the main storage unit 101 via the queue 216 and the priority circuit 217 (refer to the step D15 in FIG. 10 and the duration u12 in FIG. 11).

Where the memory protection checking circuit 54 compares the key-checking key associated with a response with a key from the memory protection key storing unit 53 (refer to the duration u11 in FIG. 11) to permit accessing (YES route in the step D17 in FIG. 10), the move-out data from the data processing unit 102 or 103 is stored in the main storage unit 101 in the step D15. Then the store data from the input/output control unit 104 is stored in the main storage unit 101 (the step D18 in FIG. 10).

Where the memory protection checking of the memory protection checking circuit 54 results in no access permission (NO route in the step D17 in FIG. 10), the move-out data from the data processing unit 102 or 103 is stored in the main storage unit 101 in the step D15 but the request A is canceled (the step D19 in FIG. 10).

Where it is decided that the tag region 52 has been retrieved rightly in the step D12, the memory protection checking information holding unit 56 corresponding to the order number may hold the result on the memory protection checked in the step D9, without invalidating the checking result of the memory protection checking unit 54. In this case, the key checking can be omitted in the step D17 in the second flow. Hence the key checking result can be obtained merely by referencing the order number associated with a response which is held in the memory protection checking information holding unit 56.

According to the second embodiment, when the input/output control unit 104 requests the memory control unit 51 of a storing process to the main storage unit 101, together with a memory protective checking operation, retrieving the second tag region 52 in response to the store request is performed in synchronism with the memory protection checking process of the memory protection deciding means in the first process flow. Thus where the memory protection checking is not permitted because of an erroneous hit of the second tag region 52, the request can be immediately canceled. Where the memory protection checking is permitted because of an erroneous hit of the second tag region 52, the store request can be made from the input/output control unit 104 to the main storage unit 101 in the same process flow.

When the second tag region 52 is hit, a move-out order is issued to the data processing unit 102 or 103, without waiting the result of a memory protection checking so that the result of the memory protection check is invalidated. Thus the memory protection checking process is resumed in the process flow responding to the order. Where the memory protection checking in the responding flow results in an access permission, the main storage unit 101 can store the move-out data from the data processing unit 102 or 103 and then stores data from the input/output control unit 104. In the case of no access permission, the main storage unit 101 stores the move-out data from the data processing unit 102 or 103, but the store request according to the request A is canceled.

If the memory protection checking does not inhibit accessing or the second tag region 52 is hit or erroneously hit, data can be stored in the main storage unit 101 at high speed. Hence the processing speed can be improved remarkably. This large effect results from the memory protection checking which rarely inhibits accessing.

Moreover, the acceptance port 114 which can be released in the first flow can improve the use efficiency, thus contributing largely to the improved system throughput.

The present embodiment uses two data processing units. However, according to the present invention, the number in use of data processing units should not be limited to a specific value, but is applicable to a desired value.

What is claimed is:

1. A memory control method for an information processing system including a memory unit, at least one of data processing units, each of which operates based on data stored in said memory unit, a memory control unit that controls data transfer between said memory unit and said data processing unit, and a buffer memory unit, said buffer memory unit having a data region which holds a piece of data stored in said memory unit of each data processing unit and a tag region which holds tag information including the address of data stored in said data unit; said memory control unit including a tag copying unit that holds a piece or all of copy information stored in said tag region in said buffer memory unit, and a port which holds a process request sent from each data processing unit or an external process request; said memory control method including issuing a predetermined processing command sent to said buffer memory unit within said data processing unit from said memory control unit, according to a process request held by said port and with reference only to said tag copying unit; and controlling the data holding state of said buffer memory unit on a store-in basis; said memory control method further comprising the steps of:

issuing said predetermined processing command sent to said buffer memory unit within said data processing unit; and setting at the same time a flag showing a process under request, to a portion to be processed under said predetermined processing command held in said tag copying unit.

2. The memory control method for an information processing system according to claim 1, further comprising the step of:

setting said flag to said tag copying unit every way, with said buffer memory unit having plural ways managed on a set-associative basis.

3. The memory control method for an information processing system according to claim 2, further comprising the step of:

resetting a flag corresponding to a process completion report in said tag copying unit when said process completion report is received from said data processing unit, in response to said predetermined process command.

4. The memory control method for an information processing system according to claim 3, further comprising the step of:

issuing said predetermined process command to be sent to said buffer memory unit within said data processing unit, on condition that all flags of the portions corresponding to said predetermined process command in said tag copying unit have been reset.

5. The memory control method for an information processing system according to claim 3, further comprising the step of:

starting the next process of said process request, on condition that all flags set in said tag copying unit at an issuance of said predetermined process command have been reset in response to said process completion report.

6. The memory control method for an information processing system according to claim 1, further comprising the step of:

releasing at the same time as said issuing step is performed said port holding said process request causing an issuance of said predetermined process command.

7. The memory control method for an information processing system according to claim 6, further comprising the step of:

resetting a flag corresponding to a process completion report in said tag copying unit when said process completion report is received from said data processing unit, in response to said predetermined process command.

8. The memory control method for an information processing system according to claim 7, further comprising the step of:

issuing said predetermined process command to be sent to said buffer memory unit within said data processing unit, on condition that all flags of the portions corresponding to said predetermined process command in said tag copying unit have been reset.

9. The memory control method for an information processing system according to claim 7, further comprising the step of:

starting the next process of said process request, on condition that all flags set in said tag copying unit at an issuance of said predetermined process command have been reset in response to said process completion report.

10. The memory control method for an information processing system according to claim 1, further comprising the step of:

resetting a flag corresponding to a process completion report in said tag copying unit when said process completion report is received from said data processing unit, in response to said predetermined process command.

11. The memory control method for an information processing system according to claim 10, further comprising the step of:

issuing said predetermined process command to be sent to said buffer memory unit within said data processing unit, on condition that all flags of the portions corresponding to said predetermined process command in said tag copying unit have been reset.

12. The memory control method for an information processing system according to claim 10, further comprising the step of:

starting the next process of said process request, on condition that all flags set in said tag copying unit at an issuance of said predetermined process command have been reset in response to said process completion report.

13. The memory control method for an information processing system according to claim 1, further comprising the steps of:

issuing said predetermined process command to said buffer memory unit while a number of responses to be sent from said data processing device is set to be the same as a number of non-responses, in response to said predetermined process command;

subtracting said non-response number every time a process completion report is received as a response to said predetermined process command, from said data processing unit; and starting the next process of said process request when said non-response number becomes zero.

14. A memory control device for an information processing system including a memory unit, at least one of data processing units each that operates based on data stored in said memory unit, and a buffer memory unit, said buffer memory unit having a data region which holds a piece of data stored in said memory unit of each data processing unit and a tag region which holds tag information including the address of data stored in said data region; said memory control device comprising:

a tag copying unit that holds a piece or all of copy information stored in said tag region in said buffer memory unit;

a port that holds a process request sent from said data processing unit or an external process request; and process command issuing means for issuing a predetermined processing command to be sent to said buffer memory unit within said data processing unit from said memory control unit, according to a process request held by said port and with reference only to said tag copying unit;

whereby the data transfer between said memory unit and said buffer memory unit is controlled on a store-in basis;

said tag copying unit including a bit with which a flag showing a process under request, to said buffer memory unit is set;

said process command issuing means including flag setting means which issues said predetermined processing command to be sent to said buffer memory unit within said data processing unit and sets at the same time a flag showing a process under request, to a portion to be processed under said predetermined processing command held in said tag copying unit.

15. The memory control device for an information processing system according to claim 14, wherein said buffer memory unit includes plural ways which are managed on a set-associative basis, and wherein said tag copying unit sets a bit setting said flag every way.

16. The memory control device for an information processing system according to claim 15, further comprising flag resetting means for resetting said flag corresponding to a process completion report in said tag copying means when said process completion report is received from said data processing unit in response to said predetermined process command.

17. The memory control device for an information processing system according to claim 16, wherein said process command issuing means issues said predetermined process command to be sent to said buffer memory unit within said data processing unit, on condition that all flags of portions to be processed under said predetermined process command in said tag copying unit are reset.

18. The memory control device for an information processing system according to claim 16, wherein the next process of said process request is started on condition that said flag resetting means resets all flags which are set in said tag copying unit at an issuance of said predetermined process command.

19. The memory control device for an information processing system according to claim 14, wherein said process command issuing means comprises porting releasing means for issuing said predetermined process command to be sent to said buffer memory unit within said data processing unit and at the same time for releasing said port which holds said process request causing an issuance of said predetermined process command.

20. The memory control device for an information processing system according to claims 19, further comprising flag resetting means for resetting said flag corresponding to a process completion report in said tag copying means when said process completion report is received from said data processing unit in response to said predetermined process command.

21. The memory control device for an information processing system according to claim 20, wherein said process command issuing means issues said predetermined process command to be sent to said buffer memory unit within said data processing unit, on condition that all flags of portions to be processed under said predetermined process command in said tag copying unit are reset.

22. The memory control device for an information processing system according to claim 20, wherein the next process of said process request is started on condition that said flag resetting means resets all flags which are set in said tag copying unit at an issuance of said predetermined process command.

23. The memory control device for an information processing system according to claim 14, further comprising flag resetting means for resetting said flag corresponding to a process completion report in said tag copying means when said process completion report is received from said data processing unit in response to said predetermined process command.

24. The memory control device for an information processing system according to claim 23, wherein said process command issuing means issues said predetermined process command to be sent to said buffer memory unit within said data processing unit, on condition that all flags of portions to be processed under said predetermined process command in said tag copying unit are reset.

25. The memory control device for an information processing system according to claim 23, wherein the next process of said process request is started on condition that said flag resetting means resets all flags which are set in said tag copying unit at an issuance of said predetermined process command.

26. The memory control device for an information processing system according to claim 14, further comprising:

a counter for setting as non-response number the number of responses to be sent from said data processing unit, in response to said predetermined process command, at the same time when said process command issuing means issues said predetermined process command to said buffer memory unit; and subtracting means for subtracting said non-response number from said counter every time the process completion report is received from said data processing unit in response to said predetermined process command;

whereby the next process of said process request is started at the time when said counter sets said non-response number to zero.

* * * * *